(12) United States Patent
Stenneth et al.

(10) Patent No.: US 11,687,094 B2
(45) Date of Patent: Jun. 27, 2023

(54) METHOD, APPARATUS, AND COMPUTER PROGRAM PRODUCT FOR ORGANIZING AUTONOMOUS VEHICLES IN AN AUTONOMOUS TRANSITION REGION

(71) Applicant: HERE GLOBAL B.V., Eindhoven (NL)

(72) Inventors: Leon Stenneth, Chicago, IL (US); Jeremy Michael Young, Chicago, IL (US); Jerome Beaurepaire, Berlin (DE)

(73) Assignee: HERE Global B.V., Eindhoven (NL)

( * ) Notice: Subject to any disclaimer, the term of this patent is extended or adjusted under 35 U.S.C. 154(b) by 40 days.

(21) Appl. No.: 17/122,465

(22) Filed: Dec. 15, 2020

(65) Prior Publication Data

US 2022/0066467 A1 Mar. 3, 2022

Related U.S. Application Data

(60) Provisional application No. 63/071,187, filed on Aug. 27, 2020.

(51) Int. Cl.
*G05D 1/02* (2020.01)
*H04W 76/10* (2018.01)
(Continued)

(52) U.S. Cl.
CPC ......... *G05D 1/0276* (2013.01); *G05D 1/0212* (2013.01); *G05D 1/0287* (2013.01);
(Continued)

(58) Field of Classification Search
CPC .. G05D 1/0276; G05D 1/0212; G05D 1/0287; G05D 2201/0213; G05D 1/0293;
(Continued)

(56) References Cited

U.S. PATENT DOCUMENTS 8,762,048 B2 6/2014 Kosseifi et al.
9,365,213 B2 6/2016 Stenneth et al.
(Continued)

FOREIGN PATENT DOCUMENTS

KR 2020-0020324 A 2/2020
WO WO 2013/087514 A1 6/2013
(Continued)

OTHER PUBLICATIONS

Dixit et al., "Autonomous Vehicles: Disengagements, Accidents and Reaction Times", PLoS One 11(12): 30168054., doi:10.1371/journal. pone.0168054 (Dec. 20, 2016).
(Continued)

*Primary Examiner* — Rodney A Butler
(74) *Attorney, Agent, or Firm* — Alston & Bird LLP

(57) ABSTRACT

A method, apparatus and computer program product are provided for managing autonomous vehicles. In this regard, vehicle context data associated with an indication of a change in an autonomous level for a vehicle traveling along a road segment is determined. Furthermore, the vehicle is assigned to a queue of vehicles traveling along the road segment in response to a determination that the vehicle context data corresponds to particular vehicle context data associated with the queue of vehicles. An indication of the queue of vehicles may also be provided to the vehicle to facilitate navigation of the vehicle.

20 Claims, 11 Drawing Sheets

(51) Int. Cl.
*H04W 4/46* (2018.01)
*B60W 60/00* (2020.01)

(52) U.S. Cl.
CPC .............. *H04W 4/46* (2018.02); *H04W 76/10* (2018.02); *B60W 60/001* (2020.02); *G05D 2201/0213* (2013.01)

(58) Field of Classification Search
CPC ...... G05D 1/0297; H04W 4/46; H04W 76/10; H04W 4/024; H04W 4/44; H04W 76/14; B60W 60/001; B60W 2556/65
See application file for complete search history.

(56) References Cited

U.S. PATENT DOCUMENTS

| | | | |
|---|---|---|---|
| 9,581,460 | B1 | 2/2017 | McNew et al. |
| 9,587,952 | B1 | 3/2017 | Slusar |
| 9,588,517 | B2 | 3/2017 | Laur et al. |
| 9,688,288 | B1 | 6/2017 | Lathrop et al. |
| 10,222,796 | B2 | 3/2019 | Ichikawa et al. |
| 10,295,363 | B1 | 5/2019 | Konrardy et al. |
| 10,337,874 | B2 | 7/2019 | Nagy et al. |
| 10,451,428 | B2 | 10/2019 | Lathrop et al. |
| 10,503,168 | B1 | 12/2019 | Konrardy et al. |
| 10,543,841 | B2 | 1/2020 | Karlsson et al. |
| 10,545,024 | B1 | 1/2020 | Konrardy et al. |
| 10,551,835 | B2 | 2/2020 | Mason et al. |
| 10,595,175 | B2 | 3/2020 | Ramalho de Oliveira |
| 2012/0165046 | A1 | 6/2012 | Rhoads et al. |
| 2014/0309833 | A1 | 10/2014 | Ferguson et al. |
| 2015/0253772 | A1 | 9/2015 | Solyom et al. |
| 2016/0334797 | A1 | 11/2016 | Ross et al. |
| 2016/0358477 | A1 | 12/2016 | Ansari et al. |
| 2017/0010613 | A1 | 1/2017 | Fukumoto |
| 2017/0102700 | A1 | 4/2017 | Kozak |
| 2017/0122749 | A1 | 5/2017 | Urano et al. |
| 2017/0123419 | A1 | 5/2017 | Levinson et al. |
| 2017/0160742 | A1 | 6/2017 | Ross et al. |
| 2017/0212525 | A1 | 7/2017 | Wang et al. |
| 2017/0227971 | A1 | 8/2017 | Shimotani et al. |
| 2017/0248963 | A1 | 8/2017 | Levinson et al. |
| 2017/0301235 | A1 | 10/2017 | Endo |
| 2017/0352125 | A1 | 12/2017 | Dicker et al. |
| 2018/0004211 | A1 | 1/2018 | Grimm et al. |
| 2018/0107216 | A1 | 4/2018 | Beaurepaire et al. |
| 2018/0237012 | A1 | 8/2018 | Jammoussi et al. |
| 2018/0266833 | A1 | 9/2018 | Carlson |
| 2018/0335776 | A1 | 11/2018 | Theis et al. |
| 2018/0339712 | A1 | 11/2018 | Kislovskiy et al. |
| 2018/0340790 | A1 | 11/2018 | Kislovskiy et al. |
| 2018/0362031 | A1 | 12/2018 | Chang et al. |
| 2018/0376357 | A1 | 12/2018 | Tavares Coutinho et al. |
| 2019/0005412 | A1 | 1/2019 | Matus et al. |
| 2019/0041228 | A1 | 2/2019 | Singhal |
| 2019/0049259 | A1 | 2/2019 | Galan-Oliveras et al. |
| 2019/0049990 | A1 | 2/2019 | Jafari Tafti et al. |
| 2019/0061782 | A1 | 2/2019 | Cheaz et al. |
| 2019/0064803 | A1 | 2/2019 | Frazzoli et al. |
| 2019/0096250 | A1 | 3/2019 | Nix et al. |
| 2019/0110103 | A1* | 4/2019 | el Kaliouby ........... A61B 5/165 |
| 2019/0120640 | A1 | 4/2019 | Ho et al. |
| 2019/0135302 | A1 | 5/2019 | Kishi et al. |
| 2019/0146508 | A1 | 5/2019 | Dean et al. |
| 2019/0163176 | A1 | 5/2019 | Wang et al. |
| 2019/0186936 | A1 | 6/2019 | Ebner et al. |
| 2019/0202467 | A1 | 7/2019 | Sun et al. |
| 2019/0232955 | A1 | 8/2019 | Grimm et al. |
| 2019/0232976 | A1 | 8/2019 | Uetani et al. |
| 2019/0333120 | A1 | 10/2019 | Ross et al. |
| 2020/0005206 | A1 | 1/2020 | van Ryzin et al. |
| 2020/0010077 | A1 | 1/2020 | Cormack et al. |
| 2020/0012873 | A1 | 1/2020 | Kim |
| 2020/0039525 | A1 | 2/2020 | Hu et al. |
| 2020/0056892 | A1 | 2/2020 | Haque et al. |
| 2020/0057451 | A1 | 2/2020 | Robert et al. |
| 2020/0079355 | A1 | 3/2020 | Chen |
| 2020/0139979 | A1 | 5/2020 | Kawanai et al. |
| 2020/0150652 | A1 | 5/2020 | Urano |
| 2020/0174470 | A1 | 6/2020 | Park et al. |
| 2020/0233426 | A1 | 7/2020 | Johnson et al. |
| 2020/0241526 | A1 | 7/2020 | Kim et al. |
| 2020/0264605 | A1 | 8/2020 | Chi-Johnston et al. |
| 2020/0264608 | A1 | 8/2020 | Rosati et al. |
| 2020/0327812 | A1 | 10/2020 | Ran et al. |
| 2020/0356100 | A1 | 11/2020 | Nagarajan et al. |
| 2021/0034059 | A1 | 2/2021 | Nagata et al. |
| 2021/0048815 | A1 | 2/2021 | McErlean et al. |
| 2021/0063162 | A1 | 3/2021 | Moskowitz et al. |
| 2021/0063178 | A1 | 3/2021 | Modi et al. |
| 2021/0122398 | A1* | 4/2021 | Kim .................... G05D 1/0038 |
| 2021/0163021 | A1 | 6/2021 | Frazzaoli et al. |
| 2021/0233284 | A1 | 7/2021 | Sugio et al. |
| 2021/0239476 | A1 | 8/2021 | Duym et al. |
| 2021/0247199 | A1 | 8/2021 | Johnson et al. |
| 2021/0341940 | A1 | 11/2021 | Baik |
| 2022/0194433 | A1 | 6/2022 | Nagata et al. |

FOREIGN PATENT DOCUMENTS

| | | |
|---|---|---|
| WO | WO 2013/165297 A1 | 11/2013 |
| WO | WO 2019/095013 A1 | 5/2019 |
| WO | WO 2019/118465 A2 | 6/2019 |
| WO | WO 2020/058431 A1 | 3/2020 |

OTHER PUBLICATIONS

Favaro et al., "Analysis of Disengagements in Semi-Autonomous Vehicles: Drivers Takeover Performance and Operational Implications", Mineta Transportation Institute, Project 1710 (Jun. 2019), 83 pages.

Favaro et al., "Autonomous Vehicle's Disengagements: Trends, Triggers, and Regulatory Limitations", Accident; Analysis and Prevention 110 (Nov. 1, 2017), pp. 136-148.

Gavanas, Nikolaos, "Autonomous Road Vehicles: Challenges for Urban Planning in European Cities", Urban Science (Jun. 3, 2019), 3, 61, 13 pages.

KPMG International Cooperative, "Assessing Countries' Preparedness for Autonomous Vehicles", KPMG 2019 Autonomous Vehicles Readiness Index (Mar. 2019), 56 pages.

Lv et al., "Analysis of Autopilot Disengagements Occurring During Autonomous Vehicle Testing", IEEE/CAA Journal of Automatica Sinica, vol. 5, No. 1 (Jan. 2018), pp. 58-68.

Extended European Search Report for European Application No. 21192183.8 dated Jan. 26, 2022, 11 pages.

Extended European Search Report for European Application No. 21192135.8 dated Feb. 3, 2022, 12 pages.

Non-Final Office Action for U.S. Appl. No. 17/122,452 dated May 18, 2022.

Non-Final Office Action for U.S. Appl. No. 17/090,437 dated Jun. 3, 2022.

Non-Final Office Action for U.S. Appl. No. 17/090,561 dated Aug. 3, 2022.

Non-Final Office Action for U.S. Appl. No. 17/090,473 dated Apr. 7, 2022.

Final Office Action for U.S. Appl. No. 17/122,452 dated Oct. 6, 2022.

Final Office Action for U.S. Appl. No. 17/090,437 dated Oct. 17, 2022.

Non-Final Office Action for U.S. Appl. No. 17/090,525 dated Sep. 21, 2022.

Final Office Action for U.S. Appl. No. 17/090,525 dated Apr. 6, 2023.

Kamireddy, L., "Decision Making Protocol in Autonomous Vehicles for Optimal Routing and Safe Control", University of Colorado, Department of Electrical, Computer, and Energy Engineering, (2019), 62 pages.

Notice of Allowance for U.S. Appl. No. 17/122,497 dated Mar. 15, 2023.

(56) References Cited

OTHER PUBLICATIONS

Office Action for European Application No. 21192183.8 dated Apr. 5, 2023, 9 pages.
Advisory Action for U.S. Appl. No. 17/122,452 dated Dec. 15, 2022.
Non-Final Office Action for U.S. Appl. No. 17/122,497 dated Dec. 6, 2022.
Final Office Action for U.S. Appl. No. 17/090,473 dated Oct. 26, 2022.
Advisory Action for U.S. Appl. No. 17/090,437 dated Dec. 28, 2022.
Non-Final Ofiice Action for U.S. Appl. No. 17/122,477 dated Jan. 17, 2023.
Final Office Action for U.S. Appl. No. 17/090,561 dated Jan. 12, 2023.
Non-Final Office Action for U.S. Appl. No. 17/122,452 dated Jan. 31, 2023.
Notice of Allowance for U.S. Appl. No. 17/090,473 dated Jan. 25, 2023.

* cited by examiner

METHOD, APPARATUS, AND COMPUTER PROGRAM PRODUCT FOR ORGANIZING AUTONOMOUS VEHICLES IN AN AUTONOMOUS TRANSITION REGION

CROSS-REFERENCE TO RELATED APPLICATIONS

This application claims the benefit of U.S. Provisional Application Patent Application No. 63/071,187, filed Aug. 27, 2020, the entire contents of which are incorporated herein by reference.

TECHNOLOGICAL FIELD

An example embodiment of the present disclosure generally relates to autonomous driving for vehicles and, more particularly, to a method, apparatus and computer program product for organizing autonomous vehicles in an autonomous transition region.

BACKGROUND

Vehicles are being built with more and more sensors to assist with autonomous driving and/or other vehicle technologies. Generally, sensors of a vehicle related to autonomous driving capture imagery data and/or radar data to assist with the autonomous driving. For instance, image sensors and Light Distancing and Ranging (LiDAR) sensors are popular sensor types for identifying objects along a road segment and establishing the safe path of traversal for a vehicle driving autonomously. Autonomous driving capabilities of vehicles are increasing toward full automation (e.g. Level 5 autonomy) with zero human interaction. However, there are numerous challenges related to autonomous driving capabilities of vehicles.

BRIEF SUMMARY

A method, apparatus and computer program product are provided in order to manage autonomous vehicles. The method, apparatus and computer program product of an example embodiment are configured to organize autonomous vehicles in an autonomous transition region. For instance, method, apparatus and computer program product of an example embodiment are configured to organize autonomous vehicles in a queue of vehicles within an autonomous transition region. As such, precision and/or confidence of autonomous driving capabilities for a vehicle can be improved. Furthermore, improved navigation of a vehicle, improved route guidance for a vehicle, improved semi-autonomous vehicle control, and/or improved fully autonomous vehicle control can be provided.

In an example embodiment, a computer-implemented method is provided for managing autonomous vehicles. The computer-implemented method includes determining vehicle context data associated with an indication of a change in an autonomous level for a vehicle traveling along a road segment. The computer-implemented method also includes assigning the vehicle to a queue of vehicles traveling along the road segment in response to a determination that the vehicle context data corresponds to particular vehicle context data associated with the queue of vehicles. Furthermore, the computer-implemented method includes providing an indication of the queue of vehicles to the vehicle to facilitate navigation of the vehicle.

In an example embodiment, the assigning the vehicle to the queue of vehicles includes assigning the vehicle to a particular lane of the road segment. In another example embodiment, the assigning the vehicle to the queue of vehicles includes establishing a communication connection between the vehicle and a particular vehicle from the queue of vehicles. In yet another example embodiment, the assigning the vehicle to the queue of vehicles includes assigning the vehicle to queue of vehicles based on a current autonomous level or a previous autonomous level associated with the vehicle.

In another example embodiment, the computer-implemented method also includes receiving time data associated with the change in the autonomous level for the vehicle. In this example embodiment, the assigning the vehicle to the queue of vehicles includes determining an ordering of the vehicle within the queue of vehicles based on the time data.

In another example embodiment, the computer-implemented method also includes receiving vehicle identification data for the vehicle. The method also includes, in this example, embodiment, determining vehicle data for the vehicle based on the vehicle identification data. In this example embodiment, the assigning the vehicle to the queue of vehicles includes assigning the vehicle to the queue of vehicles based on the vehicle data.

In another example embodiment, the computer-implemented method also includes receiving location data associated with the vehicle. In this example embodiment, the assigning the vehicle to the queue of vehicles includes assigning the vehicle to the queue of vehicles based on the location data.

In another example embodiment, the receiving the vehicle context data includes receiving an indication of a decrease in a strength of a communication signal associated with the vehicle while traveling along the road segment. In this example embodiment, the assigning the vehicle to the queue of vehicles includes identifying at least a portion of the particular vehicle context data for one or more other vehicles associated with the queue of vehicles that corresponds to the indication of the decrease in the strength for the communication signal.

In another example embodiment, the receiving the vehicle context data includes receiving an indication that the road segment associated with the vehicle satisfies a defined criterion associated with a particular road condition. In this example embodiment, the assigning the vehicle to the queue of vehicles includes identifying at least a portion of the particular vehicle context data for one or more other vehicles associated with the queue of vehicles that corresponds to the particular road condition.

In another example embodiment, the computer-implemented method also includes recommending media content for consumption by a computing device associated with the vehicle based on an estimated interval of time for the vehicle to be within the queue of vehicles.

In another example embodiment, an apparatus is configured to manage autonomous vehicles. The apparatus includes processing circuitry and at least one memory including computer program code instructions that are configured to, when executed by the processing circuitry, cause the apparatus to determine vehicle context data associated with an indication of a change in an autonomous level for a vehicle traveling along a road segment. The computer program code instructions are also configured to, when executed by the processing circuitry, cause the apparatus to assign the vehicle to a queue of vehicles traveling along the road segment in response to a determination that the vehicle context data corresponds to particular vehicle context data associated with the queue of vehicles. The computer program code instructions are also configured to, when executed by the processing circuitry, cause the apparatus to provide an indication of the queue of vehicles to the vehicle to facilitate navigation of the vehicle.

In another example embodiment, the computer program code instructions are also configured to, when executed by the processing circuitry, cause the apparatus to cause the apparatus to assign the vehicle to a particular lane of the road segment. In another example embodiment, the computer program code instructions are also configured to, when executed by the processing circuitry, cause the apparatus to establish a communication connection between the vehicle and a particular vehicle from the queue of vehicles.

In another example embodiment, the computer program code instructions are also configured to, when executed by the processing circuitry, cause the apparatus to receive vehicle identification data for the vehicle. In this example embodiment, the computer program code instructions are also configured to, when executed by the processing circuitry, cause the apparatus to determine vehicle data for the vehicle based on the vehicle identification data. Furthermore, in this example embodiment, the computer program code instructions are also configured to, when executed by the processing circuitry, cause the apparatus to assign the vehicle to the queue of vehicles based on the vehicle data.

In another example embodiment, the computer program code instructions are also configured to, when executed by the processing circuitry, cause the apparatus to receive location data associated with the vehicle. In this example embodiment, the computer program code instructions are also configured to, when executed by the processing circuitry, cause the apparatus to assign the vehicle to the queue of vehicles based on the location data.

In another example embodiment, the computer program code instructions are also configured to, when executed by the processing circuitry, cause the apparatus to receive an indication of a decrease in a strength of a communication signal associated with the vehicle while traveling along the road segment. In this example embodiment, the computer program code instructions are also configured to, when executed by the processing circuitry, cause the apparatus to identify at least a portion of the particular vehicle context data for one or more other vehicles associated with the queue of vehicles that corresponds to the indication of the decrease in the strength for the communication signal.

In another example embodiment, the computer program code instructions are also configured to, when executed by the processing circuitry, cause the apparatus to receive an indication that the road segment associated with the vehicle satisfies a defined criterion associated with a particular road condition. In this example embodiment, the computer program code instructions are also configured to, when executed by the processing circuitry, cause the apparatus to identify at least a portion of the particular vehicle context data for one or more other vehicles associated with the queue of vehicles that corresponds to the particular road condition.

In another example embodiment, a computer program product is provided to manage autonomous vehicles. The computer program product includes at least one non-transitory computer readable storage medium having computer-executable program code instructions stored therein with the computer-executable program code instructions including program code instructions configured, upon execution, to determine vehicle context data associated with an indication of a change in an autonomous level for a vehicle traveling along a road segment. The computer-executable program code instructions are also configured to assign the vehicle to a queue of vehicles traveling along the road segment in response to a determination that the vehicle context data corresponds to particular vehicle context data associated with the queue of vehicles. Furthermore, the computer-executable program code instructions are configured to provide an indication of the queue of vehicles to the vehicle to facilitate navigation of the vehicle.

In an example embodiment, the computer-executable program code instructions are also configured to assign the vehicle to a particular lane of the road segment. In an example embodiment, the computer-executable program code instructions are also configured to establish a communication connection between the vehicle and a particular vehicle from the queue of vehicles.

In another example embodiment, an apparatus is provided that includes means for managing autonomous vehicles. The apparatus of this example embodiment also includes means for determining vehicle context data associated with an indication of a change in an autonomous level for a vehicle traveling along a road segment. The apparatus of this example embodiment also includes means for assigning the vehicle to a queue of vehicles traveling along the road segment in response to a determination that the vehicle context data corresponds to particular vehicle context data associated with the queue of vehicles. The apparatus of this example embodiment also includes means for providing an indication of the queue of vehicles to the vehicle to facilitate navigation of the vehicle.

In an example embodiment, the means for assigning the vehicle to the queue of vehicles includes means for assigning the vehicle to a particular lane of the road segment. In another example embodiment, the means for assigning the vehicle to the queue of vehicles includes means for establishing a communication connection between the vehicle and a particular vehicle from the queue of vehicles. In yet another example embodiment, the means for assigning the vehicle to the queue of vehicles includes means for assigning the vehicle to queue of vehicles based on a current autonomous level or a previous autonomous level associated with the vehicle.

In another example embodiment, the apparatus of this example embodiment also includes means for receiving time data associated with the change in the autonomous level for the vehicle. In this example embodiment, the means for assigning the vehicle to the queue of vehicles includes means for determining an ordering of the vehicle within the queue of vehicles based on the time data.

In another example embodiment, the apparatus of this example embodiment also includes means for receiving vehicle identification data for the vehicle. The apparatus of this example embodiment also includes means for determining vehicle data for the vehicle based on the vehicle identification data. In this example embodiment, the means for assigning the vehicle to the queue of vehicles includes means for assigning the vehicle to the queue of vehicles based on the vehicle data.

In another example embodiment, the apparatus of this example embodiment also includes means for receiving location data associated with the vehicle. In this example embodiment, the means for assigning the vehicle to the queue of vehicles includes means for assigning the vehicle to the queue of vehicles based on the location data.

In another example embodiment, the means for receiving the vehicle context data includes means for receiving an indication of a decrease in a strength of a communication signal associated with the vehicle while traveling along the road segment. In this example embodiment, the means for assigning the vehicle to the queue of vehicles includes means for identifying at least a portion of the particular vehicle context data for one or more other vehicles associated with the queue of vehicles that corresponds to the indication of the decrease in the strength for the communication signal.

In another example embodiment, the means for receiving the vehicle context data includes means for receiving an indication that the road segment associated with the vehicle satisfies a defined criterion associated with a particular road condition. In this example embodiment, the means for assigning the vehicle to the queue of vehicles includes means for identifying at least a portion of the particular vehicle context data for one or more other vehicles associated with the queue of vehicles that corresponds to the particular road condition.

In another example embodiment, the apparatus of this example embodiment also includes means for recommending media content for consumption by a computing device associated with the vehicle based on an estimated interval of time for the vehicle to be within the queue of vehicles.

BRIEF DESCRIPTION OF THE DRAWINGS

Figure 1:
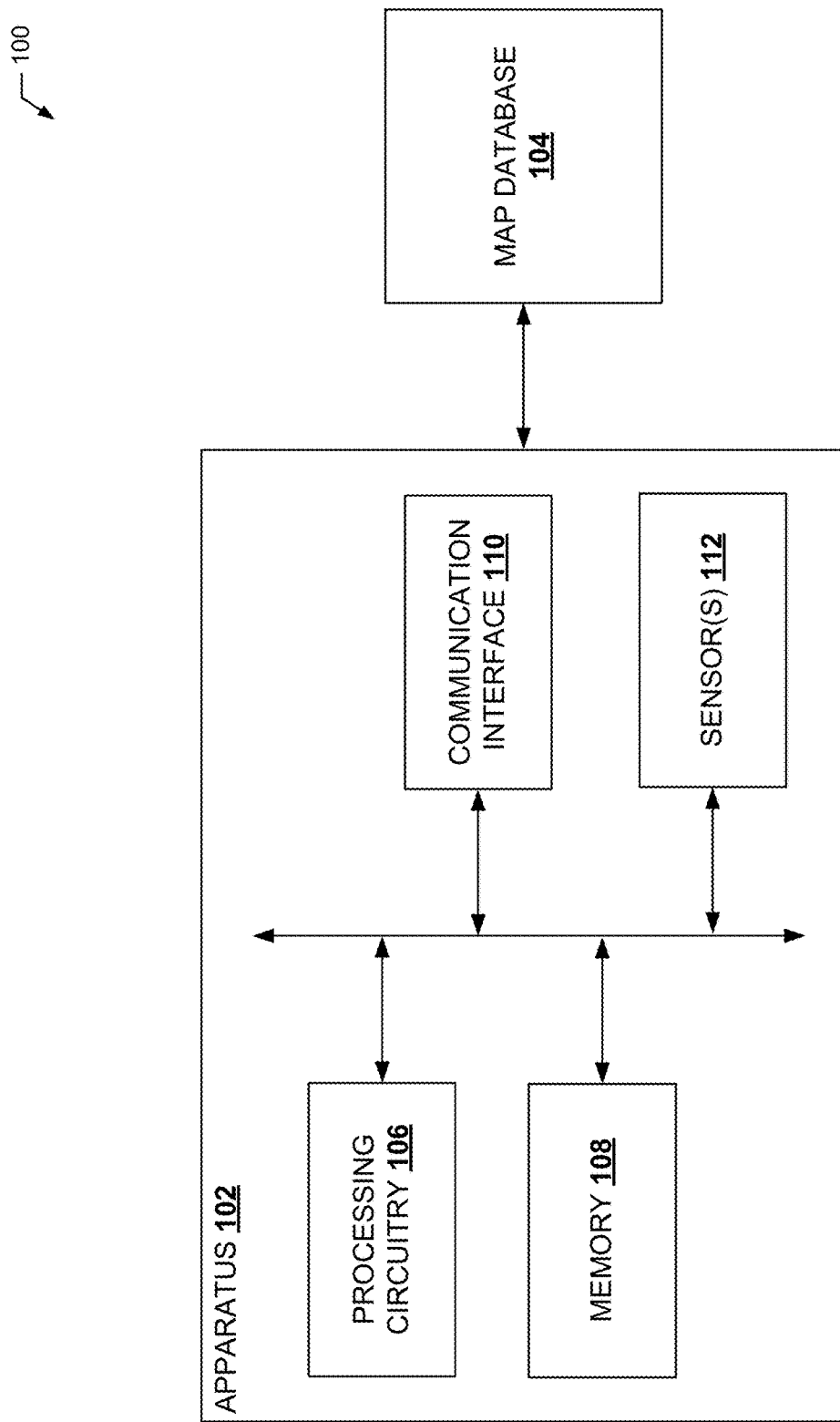
Figure 2:
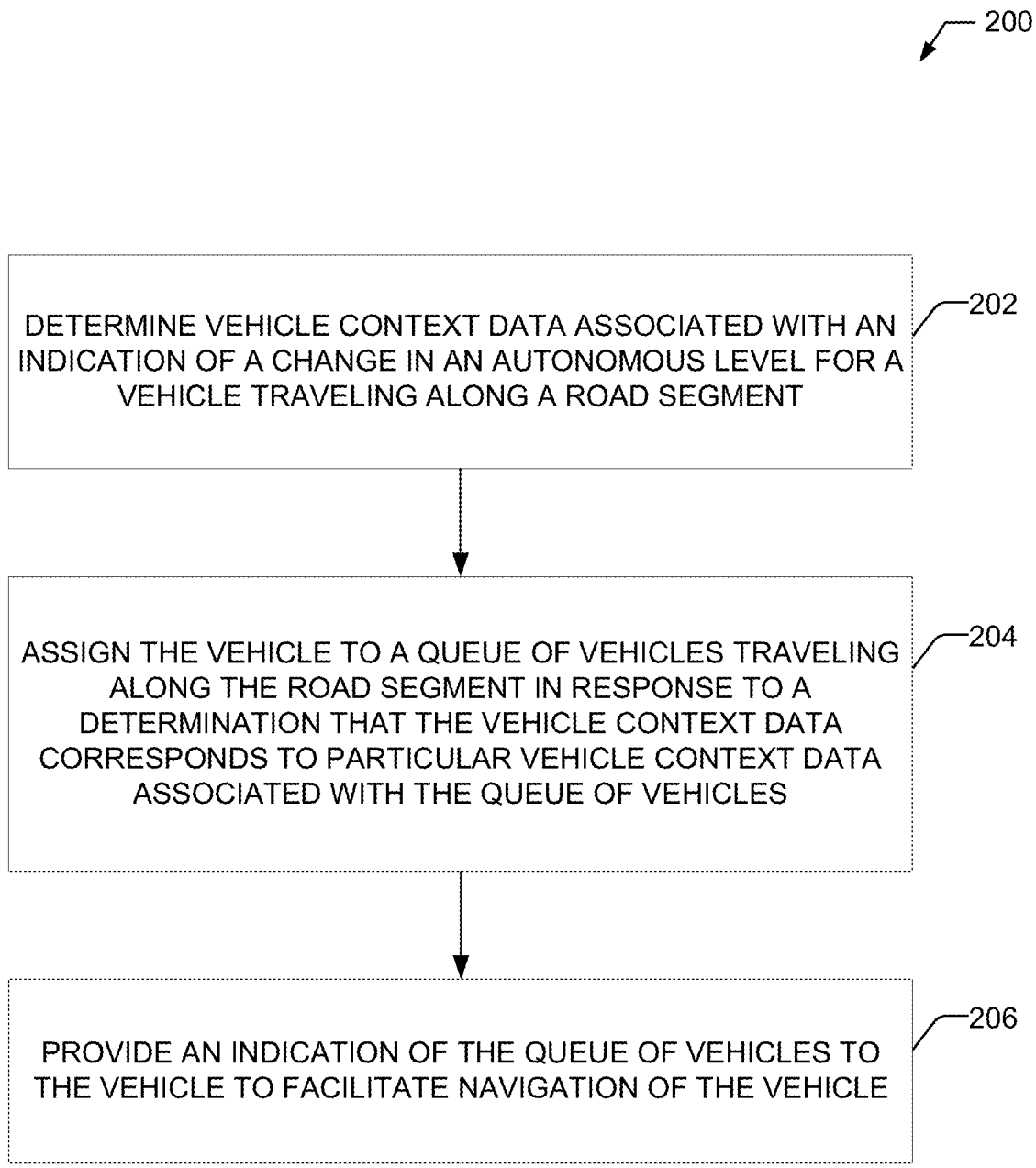
Figure 3:
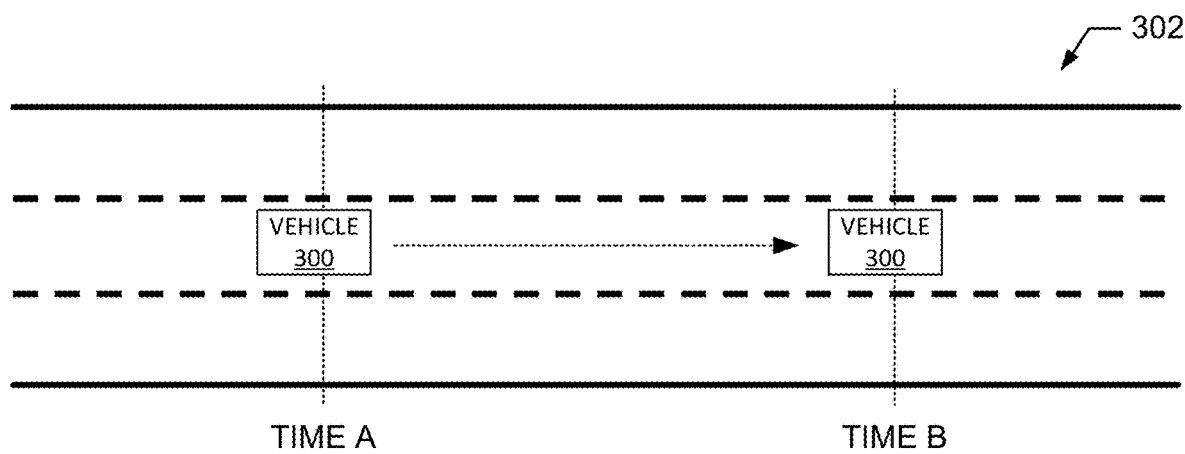
Figure 4:
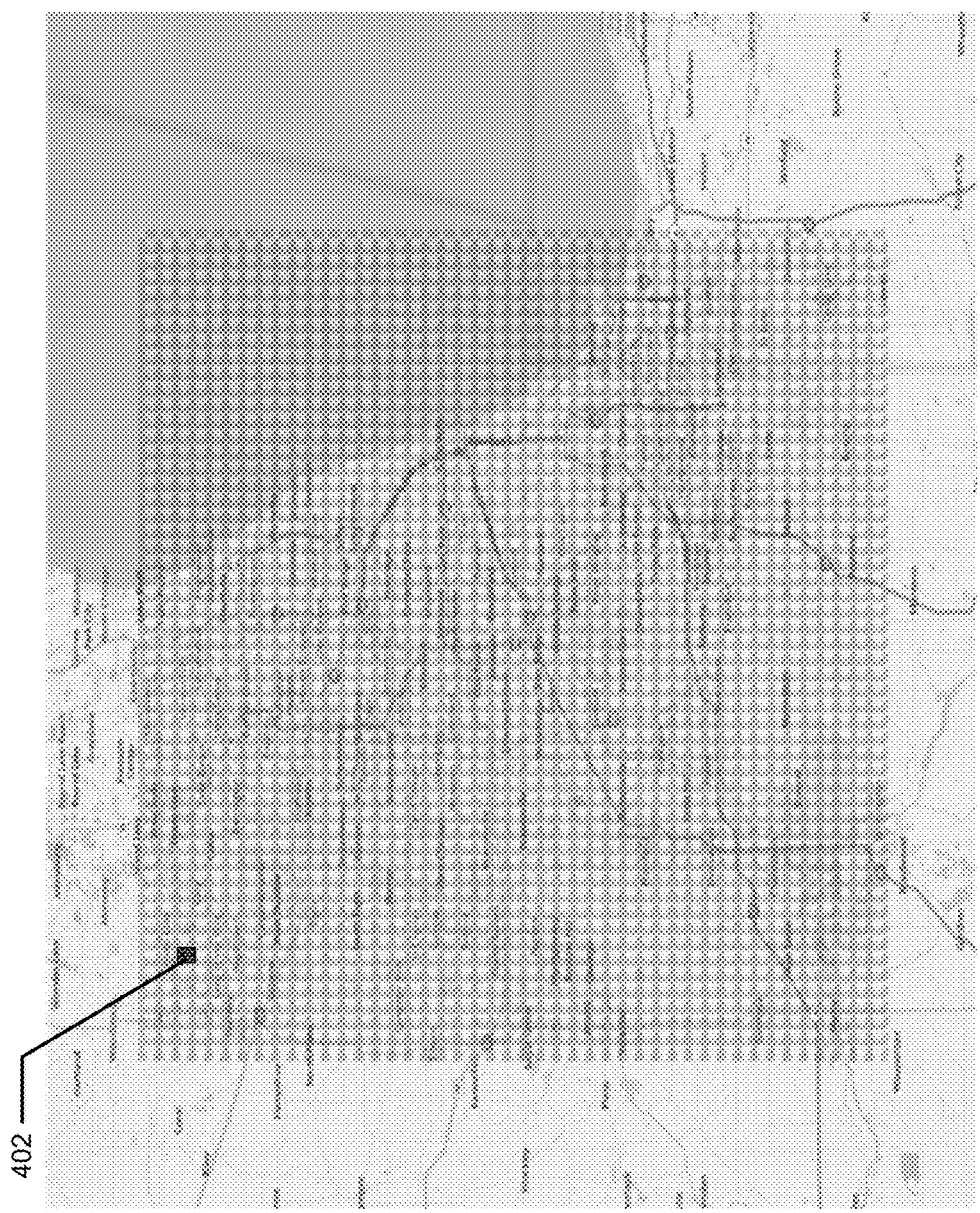
Figure 5:
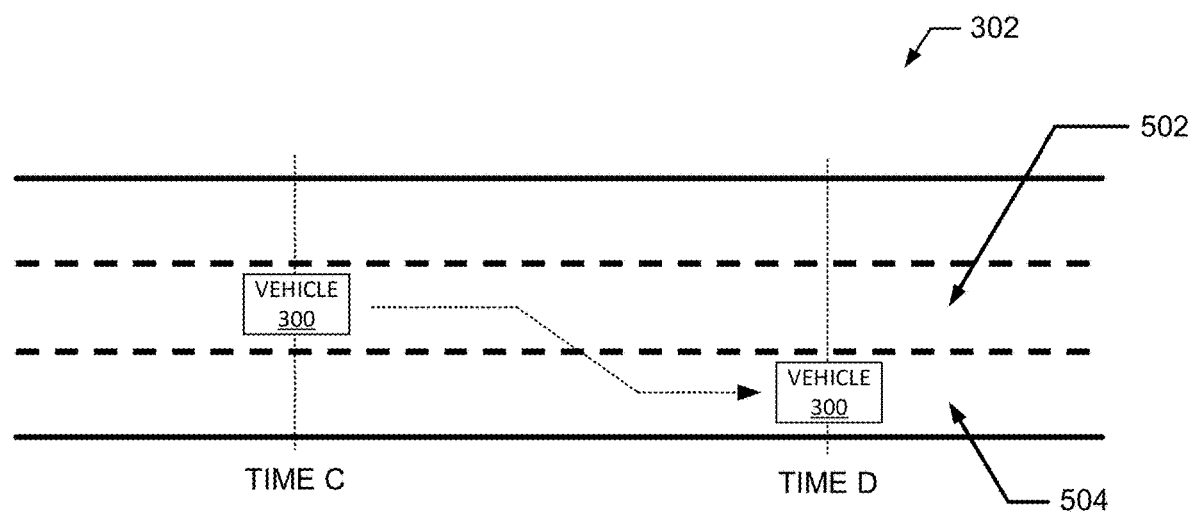
Figure 6:
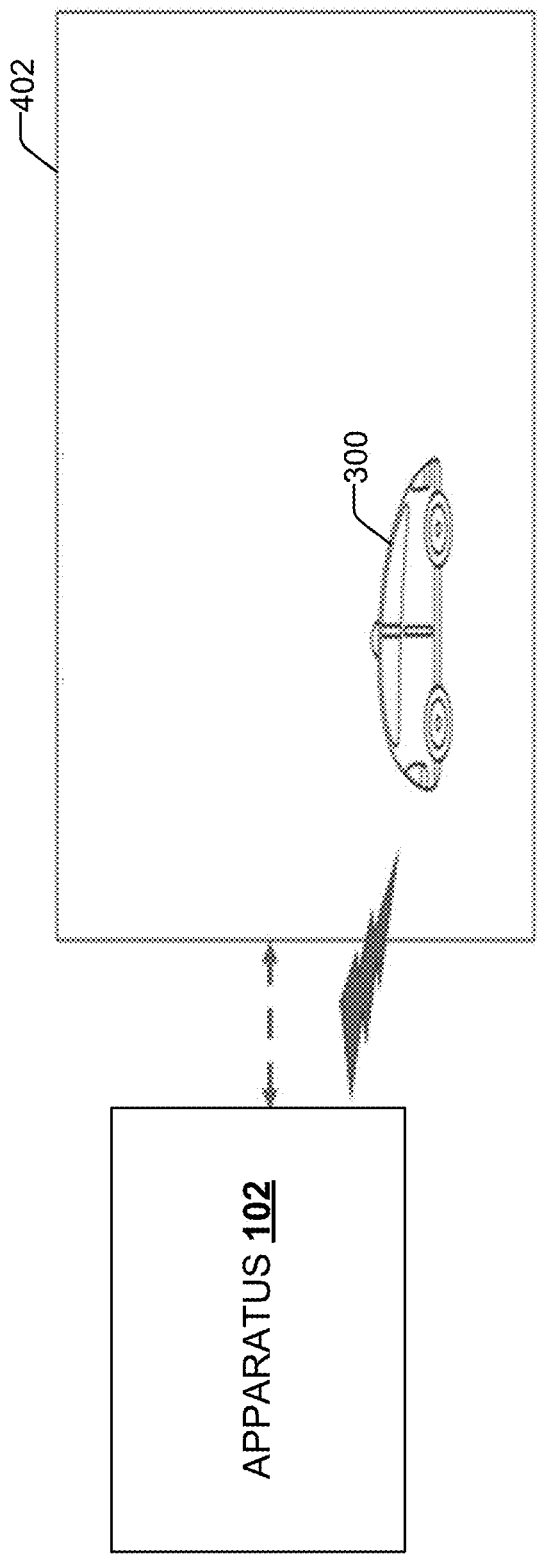
Figure 7:
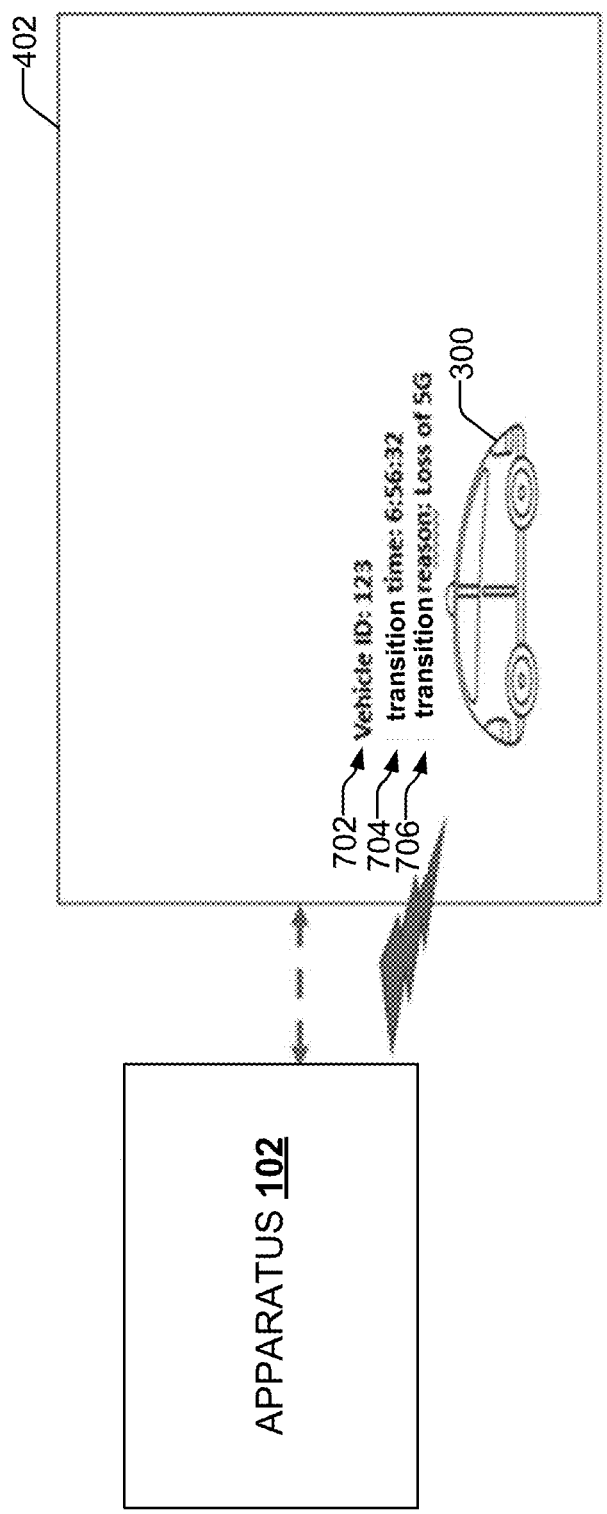
Figure 8:
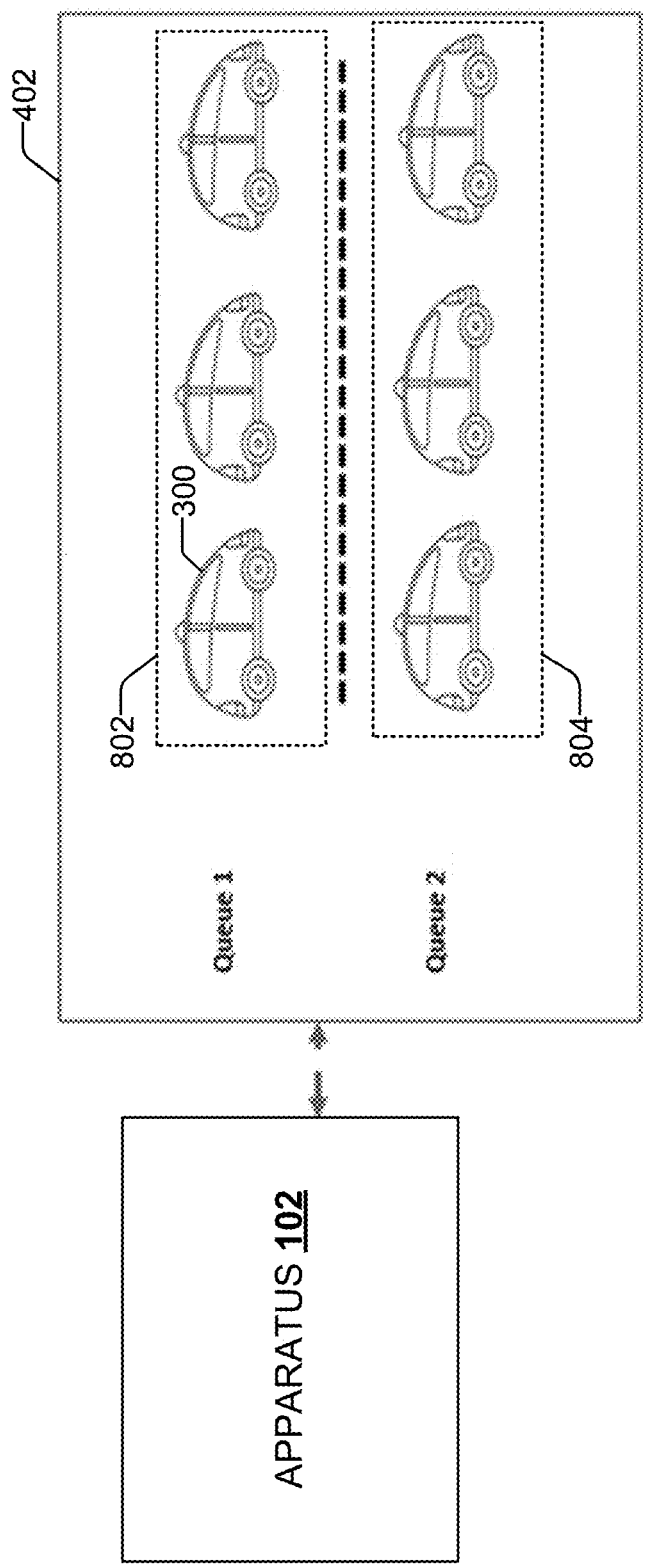
Figure 9:
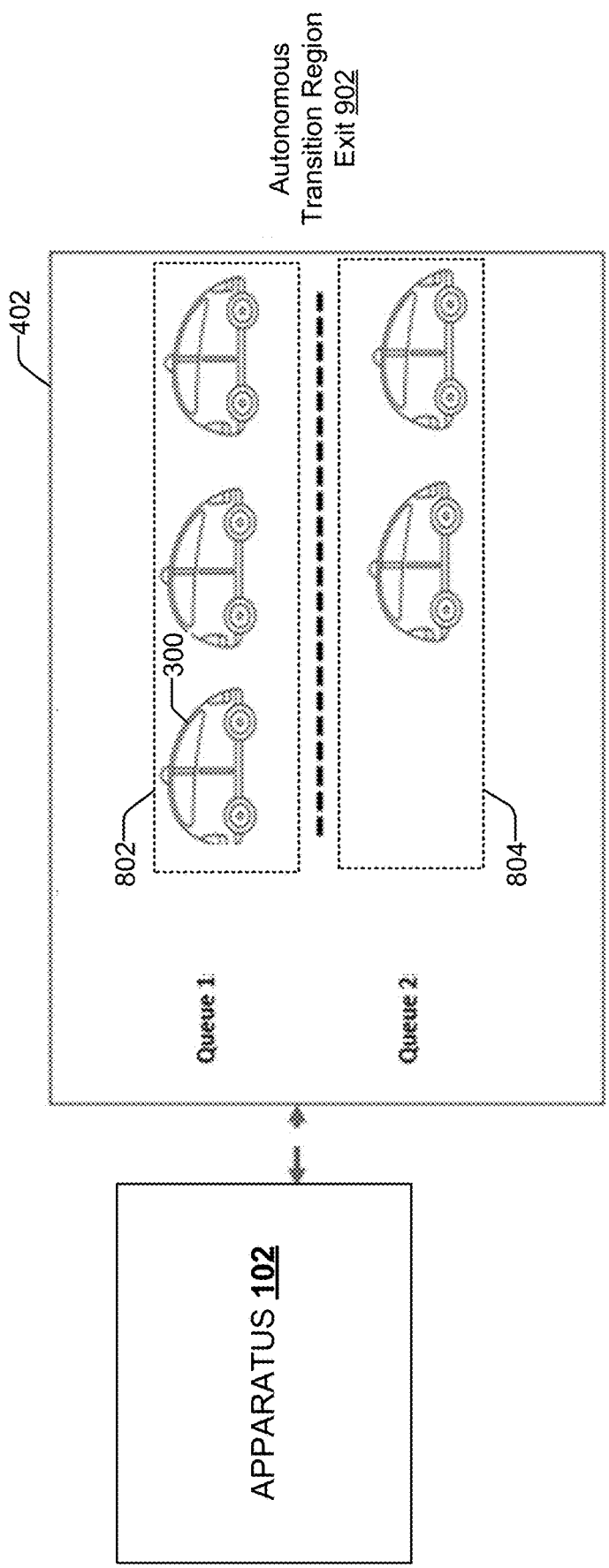
Figure 10:
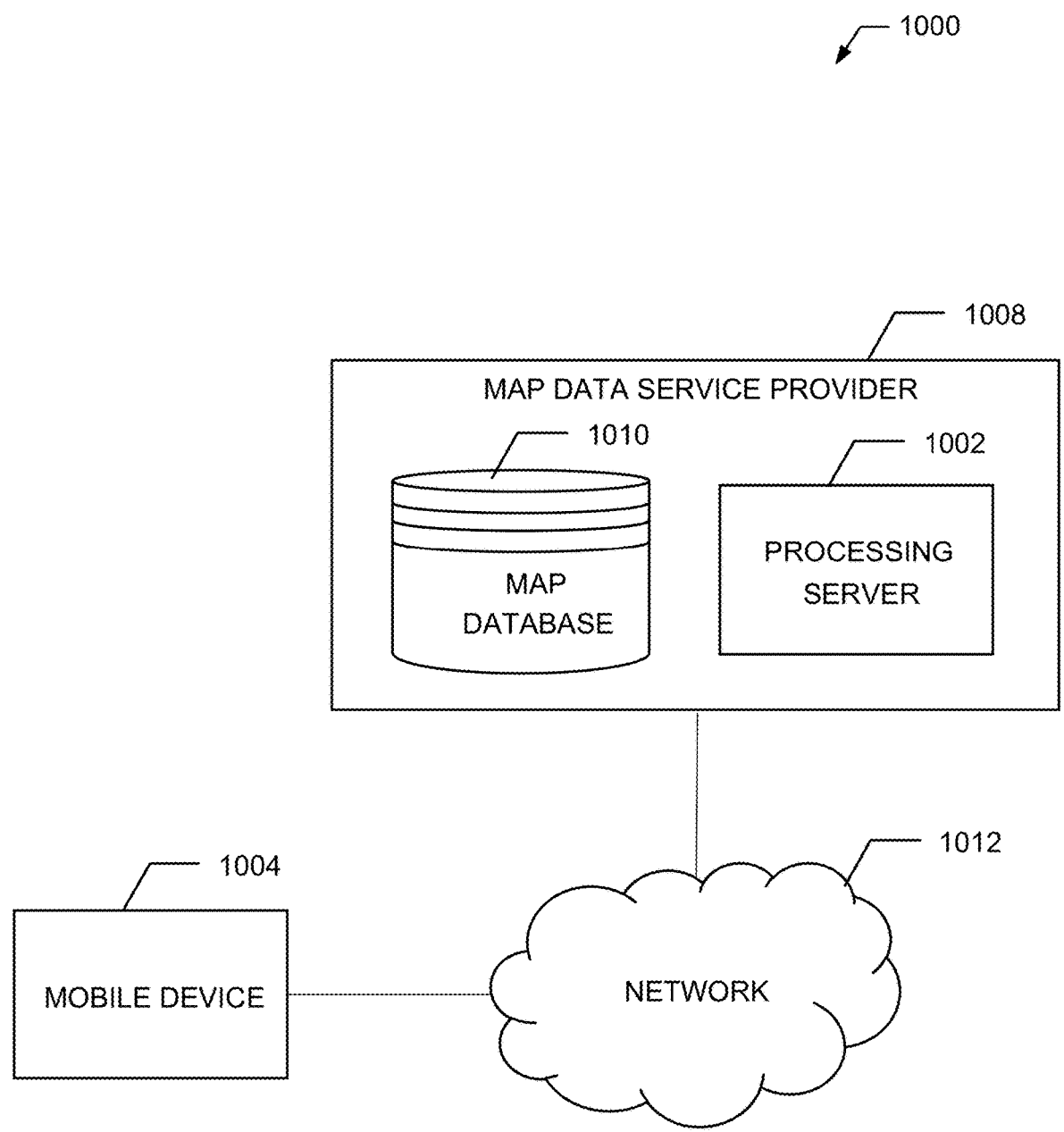
Figure 11:
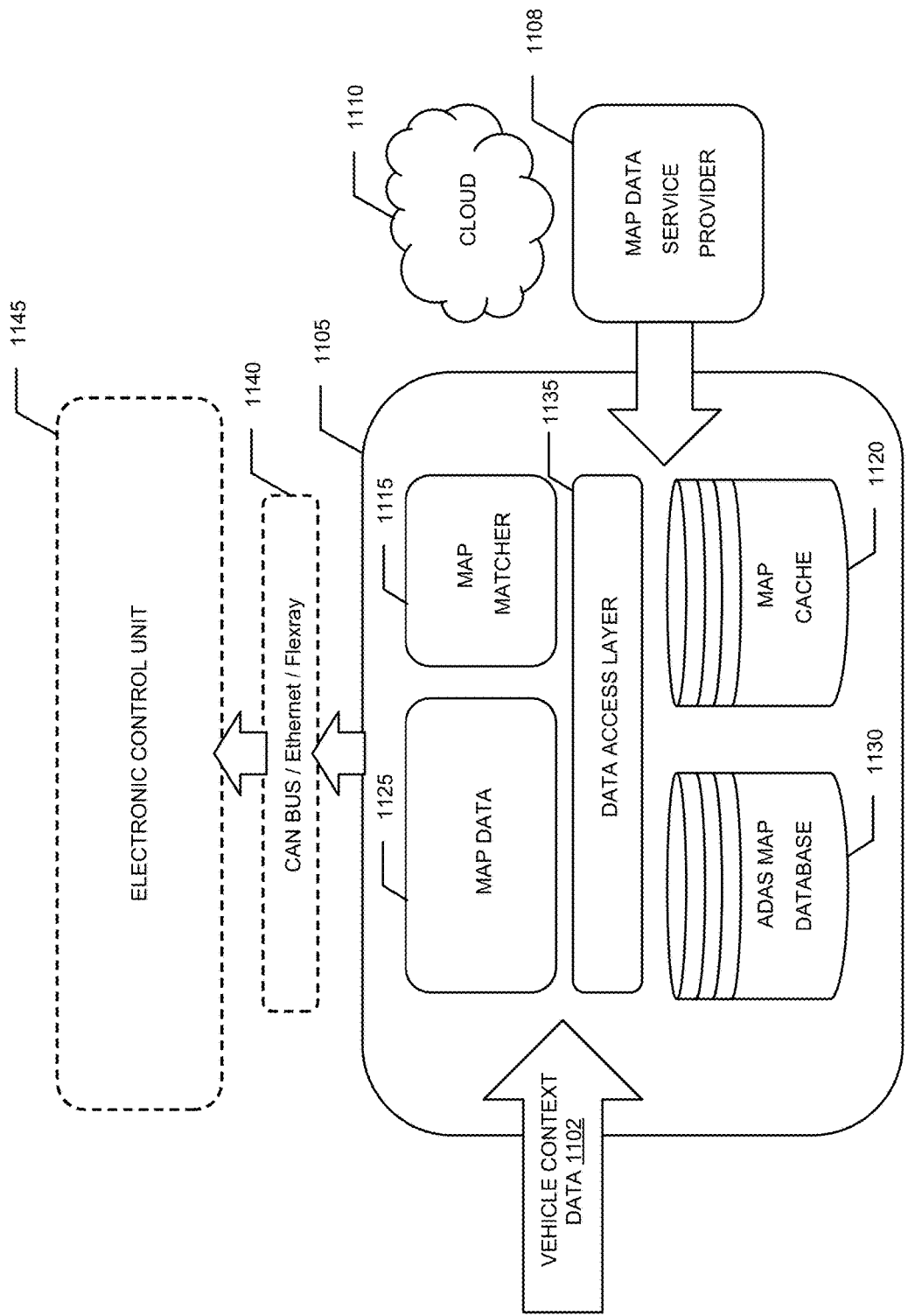

Having thus described certain embodiments of the disclosure in general terms, reference will now be made to the accompanying drawings, which are not necessarily drawn to scale, and wherein:

FIG. 1 is a block diagram of a system including an apparatus for managing autonomous vehicles in accordance with one or more example embodiments of the present disclosure;

FIG. 2 is a flowchart illustrating operations performed, such as by the apparatus of FIG. 1, in order to provide for managing autonomous vehicles in accordance with one or more example embodiments of the present disclosure;

FIG. 3 illustrates a vehicle with respect to a road segment in accordance with one or more example embodiments of the present disclosure;

FIG. 4 illustrates a map divided into autonomous transition regions in accordance with one or more example embodiments of the present disclosure;

FIG. 5 illustrates an example of a vehicle being assigned to a queue of vehicles in accordance with one or more example embodiments of the present disclosure;

FIG. 6 illustrates an example of a vehicle being in communication with an apparatus in accordance with one or more example embodiments of the present disclosure;

FIG. 7 illustrates another example of a vehicle being in communication with an apparatus in accordance with one or more example embodiments of the present disclosure;

FIG. 8 illustrates another example of a vehicle being assigned to a queue of vehicles in accordance with one or more example embodiments of the present disclosure;

FIG. 9 illustrates an example of dequeuing of vehicles in a queue of vehicles in accordance with one or more example embodiments of the present disclosure;

FIG. 10 is a block diagram of a system that facilitates generation of map data in accordance with one or more example embodiments of the present disclosure; and FIG. 11 is an example embodiment of an architecture specifically configured for implementing embodiments described herein.

DETAILED DESCRIPTION

Some embodiments of the present disclosure will now be described more fully hereinafter with reference to the accompanying drawings, in which some, but not all, embodiments of the disclosure are shown. Indeed, various embodiments of the disclosure can be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms can be used interchangeably to refer to data capable of being transmitted, received and/or stored in accordance with embodiments of the present disclosure. Thus, use of any such terms should not be taken to limit the spirit and scope of embodiments of the present disclosure.

A vehicle can become disengaged from an autonomous driving level due to, for example, environmental conditions, vehicle capabilities, sensor failures, software versions for components of a vehicle, hardware versions for components of a vehicle, sensor configurations for a vehicle, etc. To address these and/or other issues, a method, apparatus and computer program product are provided in accordance with an example embodiment in order to manage autonomous vehicles. According to one or more embodiments, autonomous vehicles can be organized in an autonomous transition region. In an embodiment, data can be collected from vehicles (e.g., autonomous driving vehicles) to facilitate mapping areas (e.g., road segments) along with a calculated likelihood that a level of autonomous driving will be possible or not for the areas. Accordingly, with this information, prediction as to whether a vehicle can successfully drive autonomously can be improved. Furthermore, in certain embodiments, navigation guidance for a vehicle can be re-routed to a route associated with an improved likelihood of driving autonomously. According to one or more embodiments, it can be determined when a level of autonomous driving mode for a vehicle is changed. In response to the change in the level of autonomous driving mode, data associated with the vehicle can collected. The collected data can include, for example, a vehicle make for the vehicle, a vehicle model for the vehicle, a previous autonomous level for the vehicle, a current autonomous level for the vehicle, a location of the vehicle during the change in the level of autonomous driving mode, a decision time of the vehicle associated with a decision to initiate the change in the level of autonomous driving mode, an execution time of the vehicle associated with execution of the change in the level of autonomous driving mode, version information for autonomous driving software and/or hardware employed by the vehicle, a reason for the change in the level of autonomous driving mode for the vehicle, and/or other information associated with the vehicle. In certain embodiments, data associated with multiple vehicles in an area can be collected via crowdsourcing to provide improved autonomous driving predictions for the area.

According to one or more embodiments, the data associated with the vehicles can be uploaded to a mapping server. Furthermore, the data from the vehicles can be aggregated into information to facilitate mapping and/or generating patterns for changes in autonomous driving modes for vehicles. In certain embodiments, an autonomous driving mode value can be mapped onto a road network and/or a road lane network. For example, in certain embodiments, an autonomous driving mode value can correspond to a number between 0-1 that corresponds to a percentage change of likelihood to demonstrate a particular autonomous level prediction. In certain embodiments, an autonomous driving mode value can be mapped by level of defined autonomy such as, for example, Level 0 that corresponds to no automation, Level 1 that corresponds to driver assistance, Level 2 that corresponds to partial automation, Level 3 that corresponds to conditional automation, Level 4 that corresponds to high automation, Level 5 that corresponds to full automation, and/or another sub-level associated with a degree of autonomous driving. In certain embodiments, different map layers can correspond to different levels of autonomous driving. Additionally, in certain embodiments, a map layer can be generated based on vehicle data such as, for example, a particular make/model of a vehicle, particular autonomous driving capabilities for a vehicle, other vehicle data, etc.

According to one or more embodiments, vehicle context data associated with an indication of a change in an autonomous level for a vehicle traveling along a road segment can be received. For instance, an autonomous transition region can be a region of a road segment where a vehicle transitions from a level of autonomy to a lower level of autonomy or a higher level of autonomy. For example, an autonomous transition region can be a region of a road segment where vehicles transition from an autonomous driving mode to a manual driving mode (e.g. due to lack of cellular network coverage in the autonomous transition region, etc.). In one or more embodiments, a vehicle can report a reason for change in an autonomous level to a server. Furthermore, in one or more embodiments, an autonomous transition region can include one or more queues of vehicles to facilitate organizing vehicles in the autonomous transition region. In one or more embodiments, the vehicle can be assigned to a queue of vehicles traveling along the road segment in response to a determination that vehicle context data for a vehicle corresponds to particular vehicle context data associated with the queue of vehicles. In one or more embodiments, a server can route a vehicle to a queue of vehicles within the autonomous transition region. In one or more embodiments, each queue of vehicles can include vehicles that changed an autonomous level for a similar reason (e.g., due to road work associated with a road segment, due to lack of cellular network coverage, etc.). Additionally or alternatively, in one or more embodiments, each queue of vehicles can include a particular type of vehicles (e.g., high occupancy vehicles, etc.). In one or more embodiments, an ordering of vehicles in a queue of vehicles can correspond to a first-in, first-out (FIFO) ordering of vehicles.

Furthermore, in one or more embodiments, an indication of the queue of vehicles can be provided to the vehicle to facilitate navigation of the vehicle. In one or more embodiments, the vehicle can transmit a signal to the server in response to the vehicle reaching the queue of vehicles. In one or more embodiments, the server can update a count of vehicles in the queue of vehicles in response to receiving the signal from the vehicle. In one or more embodiments, the server can initiate a dequeuing strategy for the queue of vehicles. In one or more embodiments, the server can determine a platoon vehicle for the queue of vehicles. The platoon vehicle can be, for example, a vehicle with a determined stable autonomous level that can lead other vehicles in the queue of vehicles. In one or more embodiments, the server can determine the dequeuing strategy based on a number of vehicles included in the queue of vehicles. In one or more embodiments, the server can determine the dequeuing strategy based on a disengagement time of vehicles in the queue of vehicles. In one or more embodiments, the server can determine one or more recommended activities for users and/or user devices located within vehicles included in the queue of vehicles. In one or more embodiments, the server can estimate an amount of time each vehicle is included in the autonomous transition region and/or the queue of vehicles. In one or more embodiments, the server can modify a position of a vehicle within the queue of vehicles in response to a determination that the vehicle has been in the autonomous transition region and/or the queue of vehicles for a certain amount of time.

Accordingly, autonomous vehicles (e.g., autonomous vehicles within an autonomous transition region) can be managed to provide improved autonomous driving and/or vehicle localization for a vehicle. Moreover, autonomous vehicles (e.g., autonomous vehicles within an autonomous transition region) can be managed to provide additional dimensionality and/or advantages for one or more sensors of a vehicle. Autonomous vehicles (e.g., autonomous vehicles within an autonomous transition region) can also be managed to provide a low cost and/or efficient solution for improved autonomous driving and/or vehicle localization for a vehicle. Computational resources for improved autonomous driving and/or vehicle localization can also be conserved. Autonomous vehicles (e.g., autonomous vehicles within an autonomous transition region) can also be managed to provide a cost effective and/or efficient solution for improved autonomous driving and/or vehicle localization. Computational resources for improved autonomous driving and/or vehicle localization by utilizing management of autonomous vehicles (e.g., autonomous vehicles within an autonomous transition region) as disclosed herein can also be relatively limited in order to allow the computational resources to be utilized for other purposes. Management of autonomous vehicles (e.g., autonomous vehicles within an autonomous transition region) as disclosed herein may additionally facilitate improved navigation of a vehicle, improved route guidance for a vehicle, improved semi-autonomous vehicle control, and/or improved fully autonomous vehicle control.

With reference to FIG. 1, a system 100 configured to manage autonomous vehicles (e.g., autonomous vehicles within an autonomous transition region) is depicted, in accordance with one or more embodiments of the present disclosure. In the illustrated embodiment, the system 100 includes an apparatus 102 and a map database 104. As described further below, the apparatus 102 is configured in accordance with an example embodiment of the present disclosure to assist navigation of a vehicle and/or to autonomous driving for a vehicle. The apparatus 102 can be embodied by any of a wide variety of computing devices including, for example, a computer system of a vehicle, a vehicle system of a vehicle, a navigation system of a vehicle, a control system of a vehicle, an electronic control unit of a vehicle, an autonomous vehicle control system (e.g., an autonomous-driving control system) of a vehicle, a mapping system of a vehicle, an Advanced Driver Assistance System module (ADAS of a vehicle), or any other type of computing device carried by or remote from the vehicle including, for example, a server or a distributed network of computing devices.

In an example embodiment where some level of vehicle autonomy is involved, the apparatus 102 can be embodied or partially embodied by a computing device of a vehicle that supports safety-critical systems such as the powertrain (engine, transmission, electric drive motors, etc.), steering (e.g., steering assist or steer-by-wire), and/or braking (e.g., brake assist or brake-by-wire). However, as certain embodiments described herein may optionally be used for map generation, map updating, and map accuracy confirmation, other embodiments of the apparatus may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. Regardless of the type of computing device that embodies the apparatus 102, the apparatus 102 of an example embodiment includes, is associated with or otherwise is in communication with processing circuitry 106, memory 108 and optionally a communication interface 110.

In some embodiments, the processing circuitry 106 (and/or co-processors or any other processors assisting or otherwise associated with the processing circuitry 106) can be in communication with the memory 108 via a bus for passing information among components of the apparatus 102. The memory 108 can be non-transitory and can include, for example, one or more volatile and/or non-volatile memories. In other words, for example, the memory 108 may be an electronic storage device (for example, a computer readable storage medium) comprising gates configured to store data (for example, bits) that can be retrievable by a machine (for example, a computing device like the processing circuitry 106). The memory 108 can be configured to store information, data, content, applications, instructions, or the like for enabling the apparatus 100 to carry out various functions in accordance with an example embodiment of the present disclosure. For example, the memory 108 can be configured to buffer input data for processing by the processing circuitry 106. Additionally or alternatively, the memory 108 can be configured to store instructions for execution by the processing circuitry 106.

The processing circuitry 106 can be embodied in a number of different ways. For example, the processing circuitry 106 may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry 106 can include one or more processing cores configured to perform independently. A multi-core processor can enable multiprocessing within a single physical package. Additionally or alternatively, the processing circuitry 106 can include one or more processors configured in tandem via the bus to enable independent execution of instructions, pipelining and/or multithreading.

In an example embodiment, the processing circuitry 106 can be configured to execute instructions stored in the memory 108 or otherwise accessible to the processing circuitry 106. Alternatively or additionally, the processing circuitry 106 can be configured to execute hard coded functionality. As such, whether configured by hardware or software methods, or by a combination thereof, the processing circuitry 106 can represent an entity (for example, physically embodied in circuitry) capable of performing operations according to an embodiment of the present disclosure while configured accordingly. Thus, for example, when the processing circuitry 106 is embodied as an ASIC, FPGA or the like, the processing circuitry 106 can be specifically configured hardware for conducting the operations described herein. Alternatively, as another example, when the processing circuitry 106 is embodied as an executor of software instructions, the instructions can specifically configure the processing circuitry 106 to perform the algorithms and/or operations described herein when the instructions are executed. However, in some cases, the processing circuitry 106 can be a processor of a specific device (for example, a computing device) configured to employ an embodiment of the present disclosure by further configuration of the processor by instructions for performing the algorithms and/or operations described herein. The processing circuitry 106 can include, among other things, a clock, an arithmetic logic unit (ALU) and/or one or more logic gates configured to support operation of the processing circuitry 106.

The apparatus 102 of an example embodiment can also optionally include the communication interface 110 that can be any means such as a device or circuitry embodied in either hardware or a combination of hardware and software that is configured to receive and/or transmit data from/to other electronic devices in communication with the apparatus 102, such as the map database 104 that stores data (e.g., map data, autonomous level data, vehicle context data, location data, geo-referenced locations, time data, timestamp data, temporal data, vehicle data, vehicle version data, software version data, hardware version data, vehicle speed data, distance data, statistical data, etc.) generated and/or employed by the processing circuitry 106. Additionally or alternatively, the communication interface 110 can be configured to communicate in accordance with various wireless protocols including Global System for Mobile Communications (GSM), such as but not limited to Long Term Evolution (LTE). In this regard, the communication interface 110 can include, for example, an antenna (or multiple antennas) and supporting hardware and/or software for enabling communications with a wireless communication network. In this regard, the communication interface 110 can include, for example, an antenna (or multiple antennas) and supporting hardware and/or software for enabling communications with a wireless communication network. Additionally or alternatively, the communication interface 110 can include the circuitry for interacting with the antenna(s) to cause transmission of signals via the antenna(s) or to handle receipt of signals received via the antenna(s). In some environments, the communication interface 110 can alternatively or also support wired communication and/or may alternatively support vehicle to vehicle or vehicle to infrastructure wireless links.

In certain embodiments, the apparatus 102 can be equipped or associated with one or more sensors 112, such as one or more GPS sensors, one or more accelerometer sensors, one or more LiDAR sensors, one or more radar sensors, one or more gyroscope sensors, one or more ultrasonic sensors, one or more infrared sensors and/or one or more other sensors. Any of the one or more sensors 112 may be used to sense information regarding movement, positioning, and/or orientation of the apparatus 102 for use in navigation assistance and/or autonomous vehicle control, as described herein according to example embodiments.

FIG. 2 illustrates a flowchart depicting a method 200 according to an example embodiment of the present disclosure. It will be understood that each block of the flowchart and combination of blocks in the flowchart can be implemented by various means, such as hardware, firmware, processor, circuitry, and/or other communication devices associated with execution of software including one or more computer program instructions. For example, one or more of the procedures described above can be embodied by computer program instructions. In this regard, the computer program instructions which embody the procedures described above can be stored, for example, by the memory 108 of the apparatus 102 employing an embodiment of the present disclosure and executed by the processing circuitry 106. As will be appreciated, any such computer program instructions can be loaded onto a computer or other programmable apparatus (for example, hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Referring now to FIG. 2, the operations performed, such as by the apparatus 102 of FIG. 1, in order to manage autonomous vehicles, in accordance with one or more embodiments of the present disclosure. As shown in block 202 of FIG. 2, the apparatus 102 includes means, such as the processing circuitry 106, the memory 108, or the like, configured to determine vehicle context data associated with an indication of a change in an autonomous level for a vehicle traveling along a road segment.

In one or more embodiments, the apparatus 102, such as the processing circuitry 106, can be configured to receive the vehicle context data in response to the change in the autonomous level for the vehicle. In one or more embodiments, the apparatus 102, such as the processing circuitry 106, can be configured to receive the vehicle context data from a database. Alternatively, in one or more embodiments, the apparatus 102, such as the processing circuitry 106, can be configured to receive the vehicle context data directly from the vehicle. In various embodiments, the change in the autonomous level for the vehicle can be determined and/or initiated by a processor (e.g., the processing circuitry 106 or other processing circuitry) of the vehicle. The change in the autonomous level for the vehicle can be, for example, an increase in the autonomous level for the vehicle or a decrease in the autonomous level for the vehicle. For example, the change in the autonomous level for the vehicle can be a transition of an autonomous level for the vehicle.

The autonomous level can be indicative of a level of defined autonomy (e.g., a degree of autonomous driving) associated with the vehicle. For instance, the autonomous level can include an indication of a particular autonomous level for the vehicle associated with the change in the autonomous level. In certain embodiments, the autonomous level can include a first indication of a first autonomous level for the vehicle prior to the change in the autonomous level and a second indication of a second autonomous level for the vehicle after the change in the autonomous level. In certain embodiments, the autonomous level can include an indication of an increase or a decrease in the autonomous level for the vehicle after the change in the autonomous level. In an example, the level of defined autonomy indicated by the autonomous level can include Level 0 that corresponds to no automation for the vehicle, Level 1 that corresponds to a certain degree of driver assistance for the vehicle, Level 2 that corresponds to partial automation for the vehicle, Level 3 that corresponds to conditional automation for the vehicle, Level 4 that corresponds to high automation for the vehicle, Level 5 that corresponds to full automation for the vehicle, and/or another sub-level associated with a degree of autonomous driving for the vehicle. In an embodiment, the autonomous level can include first autonomous level data indicative of a first level of defined autonomy of the vehicle before the change in the autonomous level for the vehicle. Additionally or alternatively, the autonomous level can include second autonomous level data indicative of a second level of defined autonomy of the vehicle after the change in the autonomous level for the vehicle. For example, in an embodiment the autonomous level can include an indication of the autonomous-level that the vehicle changed from (e.g., Level 3) and/or an indication of the autonomous-level that the vehicle changed to (e.g., Level 2).

In an embodiment, the vehicle context data can be associated with a reason for the change in the autonomous level for the vehicle. For example, in one or more embodiments, the vehicle context data can be an autonomous level transition reason. In an embodiment, the autonomous level transition reason associated with the vehicle context data can be one or more reasons why the vehicle disengaged from particular levels of defined autonomy while traveling along the road segment. Additionally or alternatively, the autonomous level transition reason associated with the vehicle context data can be one or more reasons why the vehicle engaged into particular levels of defined autonomy while traveling along the road segment.

In one or more embodiments, an autonomous level transition reason associated with the vehicle context data can include a decrease in communication signal strength (e.g. loss of a 5G signal) for the vehicle traveling along the road segment. The autonomous level transition reason associated with the vehicle context data can additionally or alternatively include a road condition (e.g., road construction, high pedestrian traffic, etc.) being present at the road segment while the vehicle is traveling along the road segment. The autonomous level transition reason associated with the vehicle context data can additionally or alternatively include a particular environmental condition (e.g., a particular weather condition, etc.) present at the road segment while the vehicle is traveling along the road segment. Furthermore, it is to be appreciated that, in one or more embodiments, the autonomous level transition reason associated with the vehicle context data can additionally or alternatively include a different type of reason associated with a change in the autonomous level for the vehicle traveling along the road segment.

Autonomous driving has become a focus of recent technology with recent advances in machine learning, computer vision, and computing power able to conduct real-time mapping and sensing of a vehicle's environment. Such an understanding of the environment enables autonomous driving in two distinct ways. Primarily, real-time or near real-time sensing of the environment can provide information about potential obstacles, the behavior of others on the roadway, and areas that are navigable by the vehicle. An understanding of the location of other vehicles and/or what the other vehicles have done and may be predicted to do may be useful for a vehicle (or apparatus 102) to safely plan a route.

Autonomous vehicles or vehicles with some level of autonomous controls provide some degree of vehicle control that was previously performed by a person driving a vehicle. Removing some or all of the responsibilities of driving from a person and automating those responsibilities require a high degree of confidence in performing those responsibilities in a manner at least as good as a human driver. For example, maintaining a vehicle's position within a lane by a human involves steering the vehicle between observed lane markings and determining a lane when lane markings are faint, absent, or not visible due to weather (e.g., heavy rain, snow, bright sunlight, etc.). As such, it is desirable for the autonomous vehicle to be equipped with sensors sufficient to observe road features, and a controller that is capable of processing the signals from the sensors observing the road features, interpret those signals, and provide vehicle control to maintain the lane position of the vehicle based on the sensor data. Maintaining lane position is merely one illustrative example of a function of autonomous or semi-autonomous vehicles that demonstrates the sensor level and complexity of autonomous driving. However, autonomous vehicle capabilities, particularly in fully autonomous vehicles, must be capable of performing all driving functions. As such, the vehicles must be equipped with sensor packages that enable the functionality in a safe manner.

In certain embodiments, the apparatus 102, such as the processing circuitry 106, can be configured to additionally receive location data associated with the vehicle traveling along the road segment. The location data can include information associated with a geographic location of the vehicle traveling along the road segment. For instance, the location data can include geographic coordinates for the vehicle. In an embodiment, the location data can include latitude data and/or longitude data defining the location of the vehicle traveling along the road segment. In an aspect, the apparatus 102, such as the processing circuitry 106, can receive the location data from the one or more sensors 112. For example, in an embodiment, the apparatus 102, such as the processing circuitry 106, can receive the location data from a GPS or other location sensor of the vehicle traveling along the road segment. In another embodiment, the apparatus 102, such as the processing circuitry 106, can receive the location data from a LiDAR sensor of the vehicle traveling along the road segment. In yet another embodiment, the apparatus 102, such as the processing circuitry 106, can receive the location data from one or more ultrasonic sensors and/or one or more infrared sensors of the vehicle traveling along the road segment. Additionally, in one or more embodiments, the location data can include information associated with the change in the autonomous level for the vehicle traveling along the road segment. For instance, in an embodiment, the location data can include first location data associated with a decision by a processor (e.g., the processing circuitry 106 or other processing circuitry) of the vehicle to initiate the change in the autonomous level for the vehicle. Additionally or alternatively, the location data can include second location data associated with execution of the change in the autonomous level by a processor (e.g., the processing circuitry 106 or other processing circuitry) of the vehicle.

In certain embodiments, the apparatus 102, such as the processing circuitry 106, can be configured to additionally receive time data associated with the vehicle traveling along the road segment. The time data can be associated with the change in the autonomous level for the vehicle traveling along the road segment. In one or more embodiments, the apparatus 102, such as the processing circuitry 106, can be configured to receive first time data associated with the decision to initiate the change in the autonomous level for the vehicle traveling along the road segment. Additionally or alternatively, in one or more embodiments, the apparatus 102, such as the processing circuitry 106, can be configured to receive second time data associated with the execution of the change in the autonomous level for the vehicle traveling along the road segment. In certain embodiments, the apparatus 102, such as the processing circuitry 106, can be configured to additionally receive vehicle version data associated with one or more components of the vehicle that facilitate autonomous driving of the vehicle traveling along the road segment. In certain embodiments, the apparatus 102, such as the processing circuitry 106, can be configured to additionally receive vehicle data associated with a vehicle type for the vehicle traveling along the road segment. For example, the apparatus 102, such as the processing circuitry 106, can be configured to receive vehicle identification data for the vehicle. Furthermore, the apparatus 102, such as the processing circuitry 106, can be configured to determine vehicle data for the vehicle based on the vehicle identification data. Additionally or alternatively, in one or more embodiments, the apparatus 102, such as the processing circuitry 106, can be configured to receive vehicle context data that includes an indication of a decrease in a strength of a communication signal associated with the vehicle while traveling along the road segment. Additionally or alternatively, in one or more embodiments, the apparatus 102, such as the processing circuitry 106, can be configured to receive vehicle context data that includes an indication that the road segment associated with the vehicle satisfies a defined criterion associated with a particular road condition (e.g., a road work condition, a high vehicle traffic condition, a high pedestrian traffic condition, a weather condition, etc.).

In one or more embodiments, the apparatus 102, such as the processing circuitry 106, can be configured to receive the vehicle context data, the location data, autonomous level data, the time data (e.g., the first time data and/or the second time data), the vehicle version data, the vehicle data and/or other data associated with the vehicle in response to the change in the autonomous level for the vehicle traveling along the road segment. In one or more embodiments, the apparatus 102, such as the processing circuitry 106, can be configured to receive the vehicle context data, the location data, autonomous level data, the time data (e.g., the first time data and/or the second time data), the vehicle version data, the vehicle data and/or other data associated with the vehicle from a database. In certain embodiments, the apparatus 102, such as the processing circuitry 106, can be configured to aggregate data associated with the vehicle based on a density-based clustering technique, such as, for example, density-based spatial clustering of applications with noise (DB-SCAN).

An example of the vehicle associated with the road segment is depicted in FIG. 3. As shown in FIG. 3, a vehicle 300 travels along a road segment 302. In one or more embodiments, the vehicle 300 can be an automobile where tires of the vehicle 300 are in contact with a road surface of the road segment 302. In an exemplary embodiment, the vehicle 300 can be associated with a first level of defined autonomy (e.g., Level 3) at a first time (e.g., TIME A shown in FIG. 3). Furthermore, at the first time (e.g., TIME A), the vehicle 300 can be associated with a first location (e.g., a particular latitude and/or longitude). In certain embodiments, the vehicle 300 (e.g., a processor of the vehicle 300) can initiate a change in the autonomous level for the vehicle 300. For example, at the first time (e.g., TIME A shown in FIG. 3), the vehicle 300 can initiate the change in the autonomous level. Additionally, at a second time (e.g., TIME B shown in FIG. 3), the vehicle 300 can be associated with a second level of defined autonomy (e.g., Level 2). Furthermore, at the second time (e.g., TIME B), the vehicle 300 can be associated with a second location (e.g., a different latitude and/or longitude).

In one or more embodiments, the vehicle (e.g., the vehicle 300) can be associated with a spatial reference point. The spatial reference point can be a portion of the road segment (e.g., the road segment 302) and/or a geographic area associated with the road segment. For example, in an embodiment, the spatial reference point can be a location point on the road segment. In another embodiment, the spatial reference point can be a geometric shape that represents at least a portion of the road segment. In yet another embodiment, the spatial reference point can be a geometric shape that represents an area that includes the road segment and/or one or more other road segments. In a non-limiting example, the spatial reference point can be a tile (e.g., a grid cell, a square area, a rectangular area, etc.) associated with the road segment. For example, the spatial reference point can be a tile (e.g., a grid cell, a square area, a rectangular area, etc.) associated with a 500 meter by 500 meter geographic area that includes the road segment. In another non-limiting example, the spatial reference point can be a polygon associated with the road segment. In yet another non-limiting example, the spatial reference point can be a line associated with the road segment. However, it is to be appreciated that, in one or more embodiments, the spatial reference point can be another geometric shape associated with the road segment.

Additionally, in one or more embodiments, the spatial reference point can correspond to an autonomous transition region. For example, the spatial reference point can be a region of one or more road segments where an autonomous level for vehicles is likely to change. In certain embodiments, the apparatus 102, such as the processing circuitry 106, can be configured to designate a cluster as the spatial reference point in response to a determination that a minimum number of vehicles is within the spatial reference point or within a certain distance from the spatial reference point. Furthermore, the apparatus 102, such as the processing circuitry 106, can be configured to employ criterion associated with distance to determine the spatial reference point. For example, the apparatus 102, such as the processing circuitry 106, can be configured to initially set the spatial reference point to correspond to a certain size (e.g., 30 meters in size). Furthermore, in certain embodiments, the apparatus 102, such as the processing circuitry 106, can be configured to dynamically alter a size of the spatial reference point based on a number of vehicles in the autonomous transition region and/or other conditions associated with the autonomous transition region.

FIG. 4 illustrates a map 400 divided into autonomous transition regions. For example, the map 400 includes at least an autonomous transition region 402. In one or more embodiments, the autonomous transition region 402 can correspond to the spatial reference point. In an embodiment, the autonomous transition region 402 can be a tile cell or a grid cell. In a non-limiting example, the autonomous transition region 402 can be a 2 kilometer by 2 kilometer tile cell. However, it is to be appreciated that the autonomous transition region 402 can be a different shape and/or a different size.

As shown in block 204 of FIG. 2, the apparatus 102 includes means, such as the processing circuitry 106, the memory 108, or the like, configured to assign the vehicle to a queue of vehicles traveling along the road segment in response to a determination that the vehicle context data corresponds to particular vehicle context data associated with the queue of vehicles. The queue of vehicles can be, for example, a group of one or more vehicles along the road segment. Furthermore, in one or more embodiments, the group of one or more vehicles can be associated with corresponding vehicle context data. In one or more embodiments, the apparatus 102, such as the processing circuitry 106, can be configured to assigning the vehicle to a particular lane of the road segment. For example, the particular lane of the road segment can correspond to the queue of the vehicles. Additionally or alternatively, in one or more embodiments, the apparatus 102, such as the processing circuitry 106, can be configured to establishing a communication connection between the vehicle and a particular vehicle from the queue of vehicles. The particular vehicle can be, for example, a platoon vehicle that directs navigation of the vehicle and/or one or more other vehicles in the queue of vehicles. In an embodiment, the particular vehicle can be a vehicle associated with a stable autonomous level (e.g., a vehicle with a low risk of an autonomous level for the vehicle being changed within the road segment).

In an embodiment, the apparatus 102, such as the processing circuitry 106, can be configured to assign the vehicle to queue of vehicles based on a current autonomous level of the vehicle. Alternatively, in another embodiment, the apparatus 102, such as the processing circuitry 106, can be configured to assign the vehicle to queue of vehicles based on a previous autonomous level associated with the vehicle. For example, in one or more embodiments, the apparatus 102, such as the processing circuitry 106, can be configured to queue the vehicle in the queue of vehicles based on a type of autonomous level transition to be performed and/or a type of autonomous level transition already performed by the vehicle. In an example, the apparatus 102, such as the processing circuitry 106, can be configured to assign the vehicle to queue of vehicles associated with vehicles transitioning from a Level 3 autonomous level to a Level 2 autonomous level. In an example, the apparatus 102, such as the processing circuitry 106, can be configured to assign the vehicle to queue of vehicles associated with vehicles transitioning from a Level 3 autonomous level to a Level 4 autonomous level.

Additionally or alternatively, in one or more embodiments, the apparatus 102, such as the processing circuitry 106, can be configured to assign the vehicle to queue of vehicles based on a vehicle capability of the vehicles, a location of the vehicle, time data associated with the vehicle, personal preferences for a driver of the vehicle, index values associated with upcoming lane autonomous level transition points for lanes of the road segment, and/or other information associated with the vehicle. For instance, in an embodiment, the apparatus 102, such as the processing circuitry 106, can be configured to assign the vehicle to queue of vehicles based on the location data associated with the vehicle. Additionally or alternatively, the apparatus 102, such as the processing circuitry 106, can be configured to assign the vehicle to queue of vehicles based on the vehicle data (e.g., the vehicle data associated with the vehicle identification) for the vehicle. Additionally or alternatively, the apparatus 102, such as the processing circuitry 106, can be configured to assign the vehicle to queue of vehicles based on the time data time data associated with the change in the autonomous level for the vehicle. In certain embodiments, the apparatus 102, such as the processing circuitry 106, can be configured to determine an ordering of the vehicle within the queue of vehicles based on the time data. Additionally or alternatively, the apparatus 102, such as the processing circuitry 106, can be configured to assign the vehicle to queue of vehicles based on vehicle context data that corresponds to a decrease in a strength of a communication signal associated with the vehicle while traveling along the road segment. For example, in one or more embodiments, the apparatus 102, such as the processing circuitry 106, can be configured to identify at least a portion of the particular vehicle context data for one or more other vehicles associated with the queue of vehicles that corresponds to the indication of the decrease in the strength for the communication signal. Additionally or alternatively, the apparatus 102, such as the processing circuitry 106, can be configured to assign the vehicle to queue of vehicles based on vehicle context data that corresponds to indication that the road segment associated with the vehicle satisfies a defined criterion associated with a particular road condition. For example, in one or more embodiments, the apparatus 102, such as the processing circuitry 106, can be configured to identify at least a portion of the particular vehicle context data for one or more other vehicles associated with the queue of vehicles that corresponds to the particular road condition.

In one or more embodiments, the apparatus 102, such as the processing circuitry 106, can be configured to assign the vehicle to a queue of vehicles based on autonomous level data. For example, in one or more embodiments, the apparatus 102, such as the processing circuitry 106, can be configured to assign the vehicle to a queue of vehicles based on a vehicle make/model, a previous autonomous level, a current autonomous level, a decision location, a decision time, an execution location, an execution time, version info and/or a reason. In one or more embodiments, the vehicle make/model can be an identifier for a vehicle make and/or a vehicle model. The previous autonomous level can be an indication of an autonomous level from which a vehicle changed from. The current autonomous level can be an indication of an autonomous level from which a vehicle changed to. The decision location can be a location in which a vehicle initiates a change in the autonomous level from the previous autonomous level to the current autonomous level. The decision time can include a time and/or a date (e.g., a timestamp) that indicates the time and/or the date in which a vehicle initiates a change in the autonomous level from the previous autonomous level to the current autonomous level. The execution location can be a location in which the autonomous level for the vehicle is changed to the current autonomous level. The execution time can include a time and/or a date (e.g., a timestamp) that indicates the time and/or the date in which the autonomous level for the vehicle is changed to the current autonomous level. The version info can indicate a version of software (e.g., firmware) and/or hardware related to autonomous driving (e.g., self-driving capabilities and/or decision) and/or vehicle navigation. The reason corresponds to the reason for the change in the autonomous level from the previous autonomous level to the current autonomous level. For example, the reason can include a user triggered reason (e.g., a reason not triggered by a drive strategy on the vehicle, but rather a driver), a drive strategy reason (e.g., an anticipated change up or down in an autonomous mode initiated by drive strategy such as, for example, a difficult road segment, road work, a construction zone, a toll plaza, etc.), a conflict-related reason (e.g., a conflict between map data and sensor observations), an environmental-related reason (e.g., weather related, etc.).

An example of the vehicle being assigned to the queue of vehicles is depicted in FIG. 5. As shown in FIG. 5, the vehicle 300 is traveling along a lane 502 of the road segment 302 at a certain time (e.g., TIME C shown in FIG. 5). Furthermore, at the certain time (e.g., TIME C), the vehicle 300 can be associated with a certain location (e.g., a certain latitude and/or longitude). Furthermore, the apparatus 102, such as the processing circuitry 106, can be configured to assign the vehicle 300 to a queue of vehicles associated with a lane 504 of the road segment 302. For example, in response to being assigned to the queue of vehicles, the vehicle 300 can navigate to the lane 504 of the road segment at a different time (e.g., TIME D shown in FIG. 5). Furthermore, at the certain time (e.g., TIME D), the vehicle 300 can be associated with a different location (e.g., a different latitude and/or longitude). In certain embodiments, the lane 504 can be a virtual lane (e.g., a lane with no markings). Additionally, in certain embodiments, the lane 504 can be created and/or altered dynamically (e.g., on an on-demand basis). For instance, in certain embodiments, a number assigned to the lane 504, a width of the lane 504, a length of the lane 504, a position of the lane 504, and/or another characteristic of the lane 504 can be created and/or altered dynamically.

An example of the vehicle (e.g., the vehicle 300) being in communication with the apparatus 102 is depicted in FIG. 6. As shown in FIG. 6, the apparatus 102 is communicatively coupled to the vehicle 300. Furthermore, the vehicle 300 can be located in an autonomous transition region (e.g., autonomous transition region 402). In an aspect, the vehicle 300 can be associated with a vehicle identification and/or a location (e.g., a latitude and/or a longitude coordinate). In one or more embodiments, the vehicle 300 can communicate with the apparatus 102 via wireless communication and/or one or more encrypted communication channels. In one or more embodiments, the vehicle 300 can communicate the vehicle context data (e.g., a reason for the change in the autonomous level for the vehicle 300) to the apparatus 102 via the wireless communication and/or one or more encrypted communication channel. For example, as depicted in FIG. 7, in one or more embodiments, the vehicle 300 can communicate vehicle identification data 702 (e.g., a vehicle ID such as "123), time data 704 (e.g., a transition time such as "6:56:32") and/or vehicle context data 706 (e.g., a transition reason such as "Loss of 5G" for the vehicle 300) to the apparatus 102.

Another example of the vehicle being assigned to the queue of vehicles is depicted in FIG. 8. As shown in FIG. 8, an autonomous transition region (e.g., autonomous transition region 402) includes at least a first queue of vehicles 802 and a second queue of vehicles 804. In an embodiment, the apparatus 102, such as the processing circuitry 106, can be configured to assign the vehicle 300 to either the first queue of vehicles 802 and or second queue of vehicles 804 based on the vehicle context data (e.g., the vehicle context data 706) for the vehicle 300. For example, the apparatus 102, such as the processing circuitry 106, can be configured to assign the vehicle 300 to the first queue of vehicle 802 in response to a determination that the vehicle context data for the vehicle 300 corresponds to particular vehicle context data associated with the first queue of vehicles 802. In an aspect, the first queue of vehicles 802 can be associated with different vehicle context data than the second queue of vehicles 804. For example, the first queue of vehicles 802 can be associated with vehicles that transitioned to a different autonomous level due to a road condition and the first queue of vehicles 802 can be associated with vehicles that transitioned to a different autonomous level due to a loss of 5G.

In certain embodiments, the apparatus 102, such as the processing circuitry 106, can be configured to manage dequeuing of vehicles in a queue of vehicles. For instance, as shown in FIG. 9, an autonomous transition region (e.g., autonomous transition region 402) can be associated with an autonomous transition region exit 902. In an example, a vehicle from the second queue of vehicles 802 can leave the second queue of vehicles 802 (e.g., exit the autonomous transition region 402) such that a number of vehicles in the second queue of vehicles 802 is decreased. For example, a number of vehicles in the second queue of vehicles 802 can be decreased from three vehicles to two vehicles in response to a vehicle leaving the second queue of vehicles 802 (e.g., exiting the autonomous transition region 402) via the autonomous transition region exit 902. In certain embodiments, the apparatus 102, such as the processing circuitry 106, can be configured to manage dequeuing of vehicles in a queue of vehicles based on a number of vehicles in the queue of vehicles. For example, the apparatus 102, such as the processing circuitry 106, can be configured to notify a vehicle in a queue of vehicles to exit the queue of vehicles in response to a determination that a number of vehicles in the queue of vehicles satisfies a defined threshold value. In another example, the apparatus 102, such as the processing circuitry 106, can be configured to notify a vehicle in a queue of vehicles to exit the queue of vehicles in response to a determination the vehicle has been in the queue of vehicles for a certain amount of time.

As shown in block 206 of FIG. 2, the apparatus 102 includes means, such as the processing circuitry 106, the memory 108, or the like, configured to provide an indication of the queue of vehicles to the vehicle to facilitate navigation of the vehicle. In an embodiment, the apparatus 102, such as the processing circuitry 106, can be configured to provide the indication of the queue of vehicles to an electronic control unit of the vehicle. In another embodiment, the apparatus 102, such as the processing circuitry 106, can be configured to provide the indication of the queue of vehicles to a display of the vehicle.

In certain embodiments, to facilitate navigation of the vehicle and/or providing the indication of the queue of vehicles to the vehicle, the apparatus 102 can support a mapping, navigation, and/or autonomous driving application so as to present maps or otherwise provide navigation or driver assistance, such as in an example embodiment in which map data is created or updated using methods described herein. For example, the apparatus 102 can provide for display of a map and/or instructions for following a route within a network of roads via a user interface (e.g., a graphical user interface). In order to support a mapping application, the apparatus 102 can include or otherwise be in communication with a geographic database, such as map database 104, a geographic database stored in the memory 108, and/or map database 1010 shown in FIG. 10. For example, the geographic database can include node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology can be used, such as electronic horizon sensors, radar, LiDAR, ultrasonic sensors and/or infrared sensors. In one or more embodiments, the other autonomous level data can be stored in the map database 104, the map database 1010, and/or another database accessible by the apparatus 102.

In example embodiments, a navigation system user interface and/or an autonomous driving user interface can be provided to provide driver assistance to a user traveling along a network of roadways where data collected from the vehicle (e.g., the vehicle 300) associated with the navigation system user interface can aid in establishing a position of the vehicle along a road segment (e.g., the road segment 302) and/or can provide assistance for autonomous or semi-autonomous vehicle control of the vehicle. Autonomous vehicle control can include driverless vehicle capability where all vehicle functions are provided by software and hardware to safely drive the vehicle along a path identified by the vehicle. Semi-autonomous vehicle control can be any level of driver assistance from adaptive cruise control, to lane-keep assist, or the like. Establishing vehicle location and position along a road segment can provide information useful to navigation and autonomous or semi-autonomous vehicle control by establishing an accurate and highly specific position of the vehicle on a road segment and even within a lane of the road segment such that map features in the map, e.g., a high definition (HD) map, associated with the specific position of the vehicle can be reliably used to aid in guidance and vehicle control.

A map service provider database can be used to provide driver assistance, such as via a navigation system and/or through an Advanced Driver Assistance System (ADAS) having autonomous or semi-autonomous vehicle control features. Referring back to FIG. 10, illustrated is a communication diagram of an example embodiment of a system for implementing example embodiments described herein. The illustrated embodiment of FIG. 10 includes a mobile device 1004, which can be, for example, the apparatus 102 of FIG. 1, such as a mobile phone, an in-vehicle navigation system, an ADAS, or the like. The illustrated embodiment of FIG. 10 also includes a map data service provider 1008. The mobile device 1004 and the map data service provider 1008 can be in communication via a network 1012. The network 1012 can be any form of wireless or partially wireless network as will be described further below. Additional, different, or fewer components can be provided. For example, many mobile devices 1004 can connect with the network 1012. In an embodiment, the map data service provider can be a cloud service. For instance, in certain embodiments, the map data service provider 1008 can provide cloud-based services and/or can operate via a hosting server that receives, processes, and provides data to other elements of the system 1000.

The map data service provider 1008 can include a map database 1010 that can include node data, road segment data or link data, point of interest (POI) data, traffic data or the like. In one embodiment, the map database 1010 can be different than the map database 104. In another embodiment, at least a portion of the map database 1010 can correspond to the map database 104. The map database 1010 can also include cartographic data, routing data, and/or maneuvering data. According to some example embodiments, the road segment data records can be links or segments representing roads, streets, or paths, as can be used in calculating a route or recorded route information for determination of one or more personalized routes. The node data can be end points corresponding to the respective links or segments of road segment data. The road link data and the node data can represent a road network, such as used by vehicles, cars, trucks, buses, motorcycles, and/or other entities. Optionally, the map database 1010 can contain path segment and node data records or other data that can represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 1010 can include data about the POIs and their respective locations in the POI records. The map database 1010 can include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 1010 can include event data (e.g., traffic incidents, construction activities, scheduled events, unscheduled events, etc.) associated with the POI data records or other records of the map database 1010.

The map database 1010 can be maintained by the map data service provider 1008 and can be accessed, for example, by a processing server 1002 of the map data service provider 1008. By way of example, the map data service provider 1008 can collect geographic data and/or dynamic data to generate and enhance the map database 1010. In one example, the dynamic data can include traffic-related data. There can be different ways used by the map data service provider 1008 to collect data. These ways can include obtaining data from other sources, such as municipalities or respective geographic authorities, such as via global information system databases. In addition, the map data service provider 1008 can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that can be available is vehicle data provided by vehicles, such as provided, e.g., as probe points, by mobile device 1004, as they travel the roads throughout a region.

In certain embodiments, at least a portion of the map database 104 can be included in the map database 1010. In an embodiment, the map database 1010 can be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems. For example, geographic data can be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 1004, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map database 1010 of the map data service provider 1008 can be a master geographic database, but in alternate embodiments, a client side map database can represent a compiled navigation database that can be used in or with end user devices (e.g., mobile device 1004) to provide navigation and/or map-related functions. For example, the map database 1010 can be used with the mobile device 1004 to provide an end user with navigation features. In such a case, the map database 1010 can be downloaded or stored on the end user device which can access the map database 1010 through a wireless or wired connection, such as via a processing server 1002 and/or the network 1012, for example.

In one embodiment, as noted above, the end user device or mobile device 1004 can be embodied by the apparatus 102 of FIG. 1 and can include an ADAS which can include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, a server and/or other device that can perform navigation-related functions, such as digital routing and map display. An end user can use the mobile device 1004 for navigation and map functions such as guidance and map display, for example, and for determination of useful driver assistance information, according to some example embodiments.

In one or more embodiments, the apparatus 102, such as the processing circuitry 106, can be additionally or alternatively configured to facilitate routing of the vehicle based on the indication of the queue of vehicles provided to the vehicle. In one or more embodiments, the apparatus 102, such as the processing circuitry 106, can be additionally or alternatively configured to facilitate routing of the vehicle based on user feedback provided in response to an indication of the queue of vehicles provided to the vehicle. In one or more embodiments, the apparatus 102, such as the processing circuitry 106, can be additionally or alternatively configured to cause rendering of data via a map display of the vehicle based on the indication of the queue of vehicles provided to the vehicle. For example, in one or more embodiments, the apparatus 102, such as the processing circuitry 106, can be additionally or alternatively configured to render a certain type of visual indicator (e.g., a red color, a green color, a yellow color, etc.) via a map display of the vehicle based on the indication of the queue of vehicles provided to the vehicle. In one or more embodiments, the apparatus 102, such as the processing circuitry 106, can be additionally or alternatively configured to provide one or more activity recommendations (e.g., provide media content) to one or more computing devices associated with the vehicle based on the indication of the queue of vehicles provided to the vehicle. For example, in an embodiment, the apparatus 102, such as the processing circuitry 106, can be additionally or alternatively configured to recommend media content for consumption by a computing device associated with the vehicle based on an estimated interval of time for the vehicle to be within the queue of vehicles.

In certain embodiments, the apparatus 102, such as the processing circuitry 106, can be configured to map the indication of the queue of vehicles onto one or more map data layers of a map (e.g., an HD map) to facilitate the autonomous driving for the vehicle and/or one or more other vehicles. For instance, in certain embodiments, the apparatus 102, such as the processing circuitry 106, can be configured to store the indication of the queue of vehicles in a map data layer of a map (e.g., an HD map) for mapping purposes, navigation purposes, and/or autonomous driving purposes associated with the road segment. In certain embodiments, the apparatus 102, such as the processing circuitry 106, can be configured to link and/or associate the indication of the queue of vehicles with one or more portions, components, areas, layers, features, text, symbols, and/or data records of a map (e.g., an HD map) associated with the road segment. In one or more embodiments, the apparatus 102, such as the processing circuitry 106, can be configured to generate a data point for a map layer associated with the road segment based on the indication of the queue of vehicles. The data point can indicate vehicle context data for the queue of vehicles and/or a location associated with the queue of vehicles. Additionally or alternatively, in one or more embodiments, the apparatus 102, such as the processing circuitry 106, can be configured to store the data point in the database associated with a map layer associated with the road segment.

In one or more embodiments, the apparatus 102, such as the processing circuitry 106, can be configured to generate one or more road links (e.g., one or more map-matched road links) for the indication of the queue of vehicles to facilitate an autonomous level prediction for the vehicle and/or one or more other vehicles. For instance, in one or more embodiments, the apparatus 102, such as the processing circuitry 106, can be configured to map the indication of the queue of vehicles onto a road network map associated with road segment. In one or more embodiments, the apparatus 102, such as the processing circuitry 106, can be configured to generate and/or update transition pattern data (e.g., disengagement pattern data and/or engagement pattern data) for a map layer associated with the road segment based on the indication of the queue of vehicles. For example, in one or more embodiments, the apparatus 102, such as the processing circuitry 106, can be configured to generate and/or update transition patterns (e.g., disengagement patterns and/or engagement patterns) associated with historical data for the road segment. In one or more embodiments, the apparatus 102, such as the processing circuitry 106, can be configured to combine real-time transition data for the first spatial reference point with historical transition patterns (e.g., historical disengagement patterns and/or historical engagement patterns) for the road segment. In one or more embodiments, the indication of the queue of vehicles can be encoded in the database and/or can be employed by one or more vehicles associated with the road segment to facilitate autonomous driving for the one or more vehicles when traveling along the road segment. In one or more embodiments, one or more notifications can be provided to a display of the vehicle and/or one or more other vehicles based on the indication of the queue of vehicles. For example, in response to a determination that a particular road segment associated with the indication of the queue of vehicles has a high level of reduction of autonomous driving level, then a notification can be generated to advise that other vehicles will be reducing a level of autonomy.

FIG. 11 illustrates an example embodiment of an architecture specifically configured for implementing embodiments described herein. The illustrated embodiment of FIG. 11 may be vehicle-based, where vehicle context data 1102 is determined for one or more vehicles (e.g., the vehicle 300) traveling along a road segment (e.g., the road segment 302). Additionally or alternatively, in one or more embodiments autonomous level data, location data and/or other data can be obtained from vehicles to facilitate assigning a vehicle to a queue of vehicles. In one or more embodiments, location data associated with one or vehicles can be obtained from the one or more vehicles using GPS or other localization techniques to facilitate assigning a vehicle to a queue of vehicles. According to one or more embodiments, the vehicle context data 1102 can be correlated to map data of the map data service provider 1108. A vehicle with autonomous or semi-autonomous control may establish accurate location and/or improved autonomous driving functionality through the vehicle context data 1102 and/or an indication of a queue of vehicles for a vehicle that is determined based on the vehicle context data 1102 to facilitate the autonomous or semi-autonomous control.

As illustrated in FIG. 11, the architecture includes the map data service provider 1008 that provides map data 1125 (e.g., HD maps and policies associated with road links within the map) to an Advanced Driver Assistance System (ADAS) 1105, which may be vehicle-based or server based depending upon the application. The map data service provider 1008 may be a cloud-based 1110 service. In one or more embodiments, the ADAS 1105 receives the vehicle context data 1102 and may provide the vehicle context data 1102 to map matcher 1115. The map matcher 1115 may correlate the vehicle context data 1102 to a road link on a map of the mapped network of roads stored in the map cache 1120. This link or segment, along with the direction of travel, may be used to establish which HD map policies are applicable to the vehicle associated with the ADAS 1105, including sensor capability information, autonomous functionality information, etc. Accordingly, in one or more embodiments, policies for the vehicle are established based on the vehicle context data 1102. The map data 1125 associated with the road segment specific to the vehicle are provided to the vehicle control, such as via the CAN (computer area network) BUS (or Ethernet or Flexray) 1140 to the electronic control unit (ECU) 1145 of the vehicle to implement HD map policies, such as various forms of autonomous or assisted driving, or navigation assistance. In certain embodiments, a data access layer 1135 can manage and/or facilitate access to the map cache 1120, the map data 1125, and/or an ADAS map database 1130. In an embodiment, at least a portion of the ADAS map database 1130 can correspond to the map database 104 and/or the map database 1010.

By employing managing autonomous vehicles in accordance with one or more example embodiments of the present disclosure, precision and/or confidence of vehicle localization and/or autonomous driving for a vehicle (e.g., the vehicle 300) can be improved. Furthermore, by managing autonomous vehicles in accordance with one or more example embodiments of the present disclosure, improved navigation of a vehicle can be provided, improved route guidance for a vehicle can be provided, improved semi-autonomous vehicle control can be provided, improved fully autonomous vehicle control can be provided, and/or improved safety of a vehicle can be provided. Moreover, in accordance with one or more example embodiments of the present disclosure, efficiency of an apparatus including the processing circuitry can be improved and/or the number of computing resources employed by processing circuitry can be reduced. In one or more embodiments, by managing autonomous vehicles in accordance with one or more example embodiments of the present disclosure, improved statistical information for a road segment can be provided to provide improved recommendations for infrastructure improvements.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Furthermore, in some embodiments, additional optional operations can be included. Modifications, additions, or amplifications to the operations above can be performed in any order and in any combination.

Moreover, although the foregoing descriptions and the associated drawings describe example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

That which is claimed:

1. An apparatus configured to manage autonomous vehicles, the apparatus comprising processing circuitry and at least one memory including computer program code instructions, the computer program code instructions configured to, when executed by the processing circuitry, cause the apparatus to:
   determine vehicle context data associated with an indication of a change in an autonomous level for a vehicle traveling along a road segment;
   in response to a determination that the vehicle context data corresponds to particular vehicle context data associated with a queue of vehicles traveling along the road segment,
      establish a communication connection between the vehicle and a particular vehicle from the queue of vehicles, and
      assign the vehicle to the queue of vehicles; and
   provide an indication of the queue of vehicles to the vehicle to cause navigation of the vehicle via a particular autonomous level associated with the particular vehicle from the queue of vehicles.

2. The apparatus of claim 1, wherein the computer program code instructions are further configured to, when executed by the processing circuitry, cause the apparatus to assign the vehicle to a particular lane of the road segment.

3. The apparatus of claim 1, wherein the computer program code instructions are further configured to, when executed by the processing circuitry, cause the apparatus to:
   receive vehicle identification data for the vehicle;
   determine vehicle data for the vehicle based on the vehicle identification data; and
   assign the vehicle to the queue of vehicles based on the vehicle data.

4. The apparatus of claim 1, wherein the computer program code instructions are further configured to, when executed by the processing circuitry, cause the apparatus to:
   receive location data associated with the vehicle; and
   assign the vehicle to the queue of vehicles based on the location data.

5. The apparatus of claim 1, wherein the computer program code instructions are further configured to, when executed by the processing circuitry, cause the apparatus to:
   receive an indication of a decrease in a strength of a communication signal associated with the vehicle while traveling along the road segment; and
   identify at least a portion of the particular vehicle context data for one or more other vehicles associated with the queue of vehicles that corresponds to the indication of the decrease in the strength for the communication signal.

6. The apparatus of claim 1, wherein the computer program code instructions are further configured to, when executed by the processing circuitry, cause the apparatus to:
   receive an indication that the road segment associated with the vehicle satisfies a defined criterion associated with a particular road condition; and
   identify at least a portion of the particular vehicle context data for one or more other vehicles associated with the queue of vehicles that corresponds to the particular road condition.

7. A computer-implemented method for managing autonomous vehicles, the computer-implemented method comprising:
   determining vehicle context data associated with an indication of a change in an autonomous level for a vehicle traveling along a road segment;
   in response to a determination that the vehicle context data corresponds to particular vehicle context data associated with a queue of vehicles traveling along the road segment,
      establishing a communication connection between the vehicle and a particular vehicle from the queue of vehicles, and
      assigning the vehicle to the queue of vehicles; and
   providing an indication of the queue of vehicles to the vehicle to cause navigation of the vehicle via a particular autonomous level associated with the particular vehicle from the queue of vehicles.

8. The computer-implemented method of claim 7, wherein the assigning the vehicle to the queue of vehicles comprises assigning the vehicle to a particular lane of the road segment.

9. The computer-implemented method of claim 7, wherein the assigning the vehicle to the queue of vehicles comprises assigning the vehicle to queue of vehicles based on a current autonomous level or a previous autonomous level associated with the vehicle.

10. The computer-implemented method of claim 7, further comprising:
   receiving time data associated with the change in the autonomous level for the vehicle,
   wherein the assigning the vehicle to the queue of vehicles comprises determining an ordering of the vehicle within the queue of vehicles based on the time data.

11. The computer-implemented method of claim 7, further comprising:

receiving vehicle identification data for the vehicle; and
determining vehicle data for the vehicle based on the vehicle identification data,
wherein the assigning the vehicle to the queue of vehicles comprises assigning the vehicle to the queue of vehicles based on the vehicle data.

12. The computer-implemented method of claim 7, further comprising:
receiving location data associated with the vehicle,
wherein the assigning the vehicle to the queue of vehicles comprises assigning the vehicle to the queue of vehicles based on the location data.

13. The computer-implemented method of claim 7, wherein the receiving the vehicle context data comprises receiving an indication of a decrease in a strength of a communication signal associated with the vehicle while traveling along the road segment, and
wherein the assigning the vehicle to the queue of vehicles comprises identifying at least a portion of the particular vehicle context data for one or more other vehicles associated with the queue of vehicles that corresponds to the indication of the decrease in the strength for the communication signal.

14. The computer-implemented method of claim 7, wherein the receiving the vehicle context data comprises receiving an indication that the road segment associated with the vehicle satisfies a defined criterion associated with a particular road condition, and
wherein the assigning the vehicle to the queue of vehicles comprises identifying at least a portion of the particular vehicle context data for one or more other vehicles associated with the queue of vehicles that corresponds to the particular road condition.

15. The computer-implemented method of claim 7, further comprising:
recommending media content for consumption by a computing device associated with the vehicle based on an estimated interval of time for the vehicle to be within the queue of vehicles.

16. A computer program product comprising at least one non-transitory computer-readable storage medium having computer-executable program code instructions stored therein, the computer-executable program code instructions comprising program code instructions that when executed by one or more processors cause the one or more processors to:
determine vehicle context data associated with an indication of a change in an autonomous level for a vehicle traveling along a road segment;
in response to a determination that the vehicle context data corresponds to particular vehicle context data associated with a queue of vehicles traveling along the road segment,
establish a communication connection between the vehicle and a particular vehicle from the queue of vehicles, and
assign the vehicle to the queue of vehicles; and
provide an indication of the queue of vehicles to the vehicle to cause navigation of the vehicle via a particular autonomous level associated with the particular vehicle from the queue of vehicles.

17. The computer program product of claim 16, further comprising program code instructions that when executed by the one or more processors cause the one or more processors to assign the vehicle to a particular lane of the road segment.

18. The computer-implemented method of claim 7, wherein the particular vehicle from the queue of vehicles directs the navigation of the vehicle based on the communication connection between the vehicle and a particular vehicle.

19. The apparatus of claim 1, wherein the particular vehicle from the queue of vehicles directs the navigation of the vehicle based on the communication connection between the vehicle and a particular vehicle.

20. The computer program product of claim 16, wherein the particular vehicle from the queue of vehicles directs the navigation of the vehicle based on the communication connection between the vehicle and a particular vehicle.

\* \* \* \* \*

UNITED STATES PATENT AND TRADEMARK OFFICE
CERTIFICATE OF CORRECTION

PATENT NO. : 11,687,094 B2
APPLICATION NO. : 17/122465
DATED : June 27, 2023
INVENTOR(S) : Leon Stenneth et al.

It is certified that error appears in the above-identified patent and that said Letters Patent is hereby corrected as shown below:

In the Claims

In Column 25, Line 43, Claim 1, delete "circuity," and insert -- circuitry, --, therefor.

Signed and Sealed this
Nineteenth Day of December, 2023

Katherine Kelly Vidal
*Director of the United States Patent and Trademark Office*